[19] US 8,831,987 B2

(12) United States Patent
Knapp et al.

(10) Patent No.: US 8,831,987 B2
(45) Date of Patent: Sep. 9, 2014

(54) MANAGING BIDS IN A REAL-TIME AUCTION FOR ADVERTISEMENTS

(75) Inventors: Jason J. A. Knapp, Solana Beach, CA (US); Fabrizio Blanco, Los Angeles, CA (US)

(73) Assignee: The Rubicon Project, Los Angeles, CA (US)

(*) Notice: Subject to any disclaimer, the term of this patent is extended or adjusted under 35 U.S.C. 154(b) by 0 days.

(21) Appl. No.: 13/091,121

(22) Filed: Apr. 20, 2011

(65) Prior Publication Data

US 2012/0030034 A1 Feb. 2, 2012

Related U.S. Application Data

(63) Continuation-in-part of application No. 12/701,225, filed on Feb. 5, 2010, now abandoned, which is a continuation-in-part of application No. 11/959,385, filed on Dec. 18, 2007, now abandoned.

(60) Provisional application No. 60/876,026, filed on Dec. 19, 2006, provisional application No. 61/326,510, filed on Apr. 21, 2010.

(51) Int. Cl.
*G06Q 40/00* (2012.01)
*G06Q 30/08* (2012.01)
*G06Q 30/02* (2012.01)

(52) U.S. Cl.
CPC ............... *G06Q 30/08* (2013.01); *G06Q 30/02* (2013.01); *G06Q 30/0275* (2013.01)
USPC .......................................... 705/37; 705/14.4

(58) Field of Classification Search
CPC .... G06Q 30/08; G06Q 30/02; G06Q 30/0275
USPC .............................................. 705/37, 14, 14.4
See application file for complete search history.

(56) References Cited

U.S. PATENT DOCUMENTS 6,285,987 B1 9/2001 Roth et al.
6,324,519 B1 11/2001 Eldering
(Continued)

FOREIGN PATENT DOCUMENTS

JP 20021163549 A 6/2002
WO WO 00/33163 6/2000
(Continued)

OTHER PUBLICATIONS

Young, Lee W.; International Search Report and Written Opinion; Apr. 23, 2008, filed in Applicant's related PCT patent application No. PCT/US07/088002.

(Continued)

*Primary Examiner* — Edward Baird
(74) *Attorney, Agent, or Firm* — Dentons US LLP

(57) ABSTRACT

A method and system conduct an auction for advertising across multiple markets. A first market conducts a first auction for a first advertising impression. A first bid is selected as the auction winner and a ratio is computed as the first bid plus a spread to the second highest bid. The price to be paid is the lower of the first bid or the first bid multiplied by the ratio. The first bid, second bid, and spread are transmitted to a second market for a second advertising impression auction. The second market respects the rules of the first market's auction where such that if the first bid is selected as the winner, a ratio is computed as the first bid plus the spread to the next highest bid. The price to be paid for the second impression is the first bid multiplied by the new ratio.

27 Claims, 12 Drawing Sheets

(56) References Cited

U.S. PATENT DOCUMENTS

| | | | |
|---|---|---|---|
| 6,487,538 | B1 | 11/2002 | Gupta et al. |
| 6,725,203 | B1 | 4/2004 | Seet et al. |
| 6,763,334 | B1 | 7/2004 | Matsumoto et al. |
| 7,038,637 | B1 | 5/2006 | Eller et al. |
| 7,085,732 | B2 | 8/2006 | Gould |
| 2002/0029186 | A1 | 3/2002 | Roth et al. |
| 2002/0107787 | A1 | 8/2002 | Mashinsky et al. |
| 2002/0165849 | A1* | 11/2002 | Singh et al. ............ 707/1 |
| 2002/0169760 | A1 | 11/2002 | Cheung et al. |
| 2003/0033292 | A1* | 2/2003 | Meisel et al. ............ 707/3 |
| 2003/0055729 | A1 | 3/2003 | Bezos et al. |
| 2003/0135460 | A1 | 7/2003 | Talegon |
| 2003/0195837 | A1* | 10/2003 | Kostic et al. ............ 705/37 |
| 2003/0220866 | A1 | 11/2003 | Pisaris-Henderson et al. |
| 2004/0044571 | A1 | 3/2004 | Bronnimann et al. |
| 2004/0111319 | A1 | 6/2004 | Matsumoto et al. |
| 2004/0133469 | A1* | 7/2004 | Chang ............ 705/14 |
| 2004/0267612 | A1 | 12/2004 | Veach |
| 2004/0267878 | A1 | 12/2004 | Osias |
| 2005/0027594 | A1 | 2/2005 | Yasnovsky et al. |
| 2005/0033682 | A1 | 2/2005 | Levy et al. |
| 2005/0038900 | A1 | 2/2005 | Krassner et al. |
| 2005/0137939 | A1 | 6/2005 | Calabria et al. |
| 2005/0144064 | A1 | 6/2005 | Calabria et al. |
| 2005/0216335 | A1 | 9/2005 | Fikes et al. |
| 2005/0228736 | A1* | 10/2005 | Norman et al. ............ 705/37 |
| 2005/0228746 | A1 | 10/2005 | McHale et al. |
| 2005/0267805 | A1 | 12/2005 | Tarantino |
| 2006/0074752 | A1 | 4/2006 | Newmark |
| 2006/0095281 | A1 | 5/2006 | Chickering et al. |
| 2006/0095336 | A1 | 5/2006 | Heckerman et al. |
| 2006/0106709 | A1 | 5/2006 | Chickering et al. |
| 2006/0106710 | A1 | 5/2006 | Meek et al. |
| 2006/0122907 | A1 | 6/2006 | Gould |
| 2006/0129453 | A1 | 6/2006 | Gardner et al. |
| 2006/0178900 | A1 | 8/2006 | Shilo et al. |
| 2006/0190333 | A1 | 8/2006 | Choi |
| 2006/0190385 | A1 | 8/2006 | Dresden |
| 2006/0224496 | A1* | 10/2006 | Sandholm et al. ............ 705/37 |
| 2006/0271426 | A1 | 11/2006 | Borgs et al. |
| 2006/0271429 | A1 | 11/2006 | Borgs et al. |
| 2007/0121848 | A1* | 5/2007 | Faber et al. ............ 379/114.13 |
| 2007/0130009 | A1* | 6/2007 | Steelberg et al. ............ 705/14 |
| 2008/0046924 | A1 | 2/2008 | Hood |
| 2008/0162329 | A1 | 7/2008 | Knapp et al. |
| 2008/0195458 | A1 | 8/2008 | Anschutz et al. |
| 2010/0145809 | A1 | 6/2010 | Knapp et al. |

FOREIGN PATENT DOCUMENTS

| | | |
|---|---|---|
| WO | WO 00/41105 | 7/2000 |
| WO | WO 01/43027 | 6/2001 |
| WO | WO 03/025823 | 3/2003 |
| WO | WO 03/058531 | 7/2003 |
| WO | WO 2004/068299 | 8/2004 |
| WO | WO 2006/026030 | 3/2006 |
| WO | WO 2006/062760 | 6/2006 |
| WO | WO 2006/096768 | 9/2006 |
| WO | WO 2006/097826 | 9/2006 |
| WO | WO 2006/104854 | 10/2006 |
| WO | WO 2006/127645 | 11/2006 |
| WO | WO 2006/128104 | 11/2006 |

OTHER PUBLICATIONS

Baird, Edward J.; Office Action; Jan. 25, 2011, filed in Applicant's co-pending U.S. Appl. No. 11/959,385.

* cited by examiner

MANAGING BIDS IN A REAL-TIME AUCTION FOR ADVERTISEMENTS

CROSS-REFERENCES TO RELATED APPLICATIONS

This application is a continuation-in-part patent application to U.S. patent application Ser. No. 12/701,225 filed on Feb. 5, 2010 now abandoned, which is a continuation-in-part patent application to U.S. patent application Ser. No. 11/959,385 filed on Dec. 18, 2007 now abandoned, which claims the benefit of U.S. Provisional Patent Application Ser. No. 60/876,026 filed Dec. 19, 2006, now expired. This also patent application claims the benefit of U.S. Provisional Patent Application Ser. No. 61/326,510 filed on Apr. 21, 2010. All patent references cited in this paragraph are incorporated by reference herein.

BACKGROUND OF THE INVENTION

1. Field of the Invention

This invention relates to data processing and, in particular, conducting an auction for an advertising impression.

2. Description of the Related Art

Advertisers try to reach consumers in a variety of ways. One of those ways is through web-based advertising on the Internet. A common way for advertisers to reach consumers on the Internet is by presenting ads in web sites, either as a pop-up window or embedded within the web page being viewed by the consumer. Web sites, such as MSN, MySpace, and Yahoo, rely on advertising as an increasingly important source of revenue. But unless advertisers realize returns from advertising on a web site (e.g., in the form of a purchase or a visit to the advertiser's web site), advertisers may reduce or even stop advertising on the web site. Accordingly, web sites have an interest in selecting an ad that generates revenue for the web site and provides some form of return to the advertiser. In addition, when an advertiser offers to buy advertising in one market, it may be desirable for such a market (or the advertiser) to attempt to secure an impression to fulfill this offer to buy at the minimum price possible in a second market (e.g., for an impression offered by a third party). Likewise, it may be desirable for a market to offer its impressions to other markets in order to maximize competitive bidding for the impression. In this regard, prior art advertisement selection processes fail to provide an acceptable methodology for securing bids across multiple markets that each have different advertisers offering to buy impressions at different prices. To better understand the problems of the prior art, a description of prior art advertisements and the selection and determination of advertisements is useful.

Advertisers may try to reach consumers by presenting commercials or advertising in broadcast programming (e.g., on televisions) or on portable devices (e.g., personal digital assistants, cellular phones, etc.). Similar to advertising on websites, advertisers expect a return on their investment associated with placing advertisements into or part of programming If the advertiser doesn't realize a return, the advertiser will be less inclined to (or will no longer) purchase advertisements from the broadcast network (thereby decreasing a broadcast networks revenue). Accordingly, broadcast networks (e.g., FOX™, CBS™, cable networks, etc.) have a desire to select ads that generate revenue for the network as well as provide some sort of return to the advertiser.

Similarly, the wide-spread adoption of small thin client devices such as cellular phones has expanded the capability to access the internet and receive advertisements on such devices. It is desirable for cellular or local networks on which the thin client devices are operating to select ads that generate revenue for the network as well as provide a return on investment to the advertiser. Alternatively, the content provider may have such desires.

Many advertisements are sold on a "2nd price auction" (i.e., "fair market value" or "dynamic pricing") basis, where the advertiser offers to pay one price in an asynchronous auction (bids are placed ahead of the impressions actually occurring). The price could be on a CPM (cost per thousand impressions), CPC (cost per click), CPA (cost per action such as a purchase) or other basis. This price represents a maximum price. If the price is not a CPM price, it is converted to a predicted CPM based on past experience using the proprietary algorithms of that platform. An advertisement is selected (probably the highest such CPM, but other factors such as pacing come into play). The selected advertisement is compared to the next highest such bid plus some spread (e.g., plus 5% or plus $0.05) and a ratio is computed between this and the original CPM for the winning ad. The price actually charged is the lower of the actual bid or the actual bid multiplied by this ratio.

For example, suppose advertiser A placed the highest CPM bid of $1. Further suppose that advertiser B placed the second highest bid of $0.50 with a spread of 5%. Advertiser A is charged 0.525/1*1=$0.525.

Other types/variations of second price auctions may also be used. For example, the price actually charged could be the second best or second best plus a fixed amount (e.g., one penny, etc.).

With second price auctions, an issue arises when the marketplace (that conducted an advertisement selection as described above) is attempting to secure an advertisement in another market (e.g., using a real-time bid auction [see detailed description below]) by bidding against inventory in the other market. For example, suppose market A conducts the above described auction. Further suppose that market A sends the resulting bid ($0.525) from advertiser A to market B to try and win an impression in market B. However, in market B, assume advertiser C has placed a CPM bid of $0.75. Accordingly, advertiser C may win the auction and is charged $0.75 even though advertiser A was willing to pay $1. Accordingly, the prior art fails to provide a mechanism for securing advertisement impressions across multiple markets.

SUMMARY OF THE INVENTION

The subject matter described herein relates to systems, methods, and articles including computer-readable media to enable an auction (e.g., bidding) for presenting advertisements across multiple markets by respecting one market's rules for conducting an auction during the auction process.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

An advertising impression is an individual instance when an advertisement (ad) is shown to a particular user. For example, when a user selects a web page to view, that instance of the web page may provide one or more opportunities for an ad impression (also referred to as an "impression"). If the user selects to view another web page, the other web page may provide one or more additional opportunities for an ad impression, i.e., another instance when an ad can be presented to the user. The subject matter described herein relates to systems, methods, and articles including computer-readable media to enable an auction (e.g., bidding) for presenting ads for each impression as the impression (e.g., a web page) is served and/or rendered.

Figure 1:
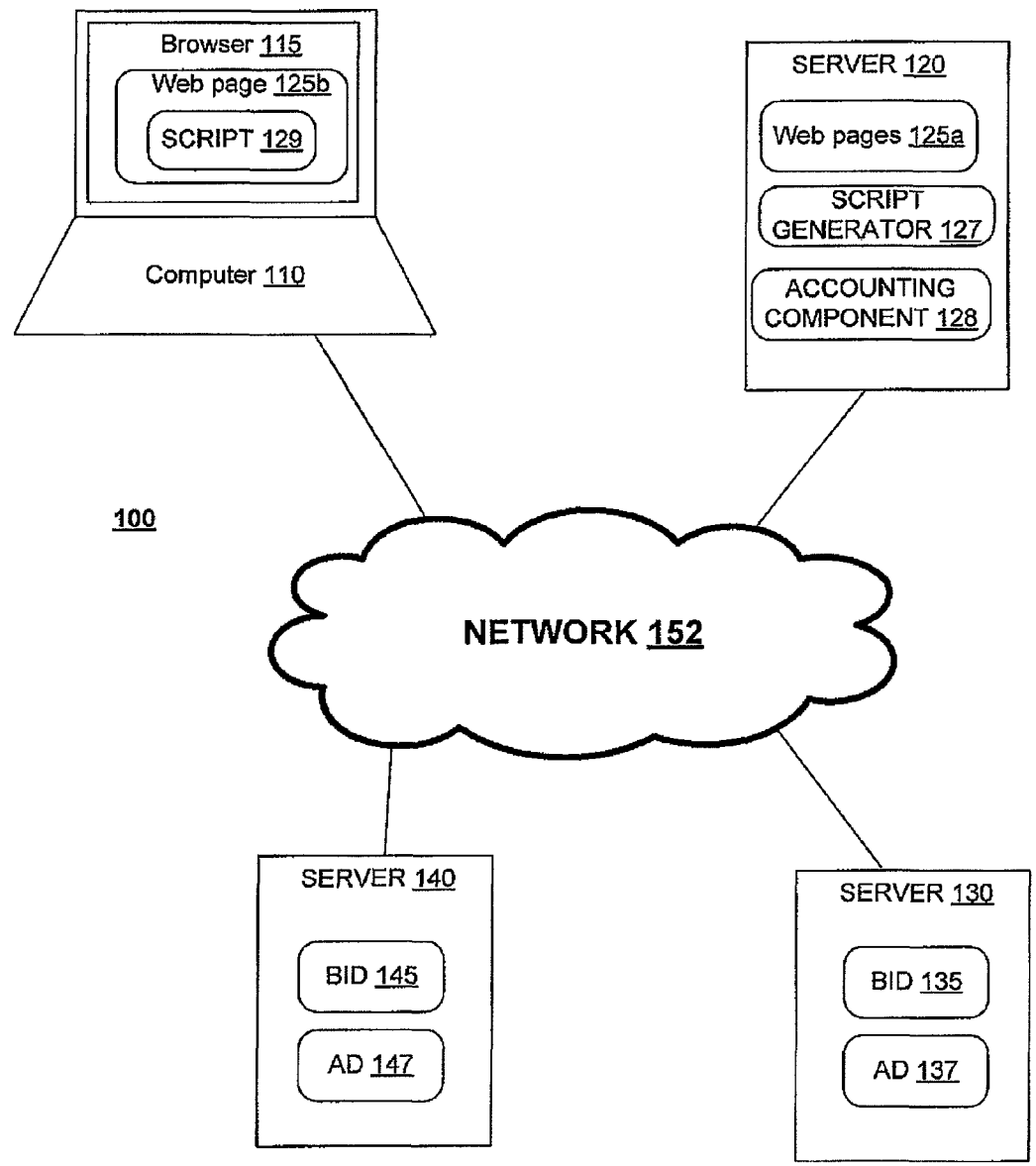
FIG. 1 is a block diagram illustrating a system for presenting ads based on bids.

FIG. 1 depicts a system 100 including a computer 110 coupled to servers 120-140 through a network 152, such as the Internet or any other communications medium. The computer 110 includes a browser 115. A browser (also known as a web browser) is a software application used to locate and display information content, such as web pages. A web page is a document on the web. For example, a web page may be implemented as HTML (Hyper Text Markup Language) files and/or any related files for scripts and graphics, as well as hyperlinks to other documents on the web.

The server 120 may include content information, such as one or more web pages 125a or other information content (e.g., music, television, video, and the like), all of which can be provided to browser 115. The server 120 may include a script generator 127 for generating scripts and an accounting component 128 for tracking the number of times an ad is provided to a browser for presentation and tracking any clicks on that ad.

Although FIG. 1 depicts script generator 127 and accounting component 128 included within server 120, script generator 127 and/or accounting component 128 may be located anywhere and in multiple locations. For example, in some implementations, server 120 may redirect the request to one or more other servers, such as server 130, server 140, and/or an ad server, i.e., a server that stores, links, and/or delivers ads. When that is the case, script generator 127 at the other server 130 or 140 provides script 129, which may be inserted into information, such as web page 125b. Moreover, the other server 130/140 may be able to serve ads to browser 115 as well. Moreover, although servers 120-140 are depicted as individual servers, each of servers 120-140 may be implemented as a plurality of servers.

The script generator 127 generates scripts, such as script 129, that are embedded in a web page, such as web page 125b, and provided to browser 115. The script 129 polls servers 130 and 140 to solicit an indication of whether servers 130 and 140 are interested in presenting an ad for a pending impression, such as the impression associated with web page 125b. The indication may be in the form of bids 135 and 145. The script 129 may poll each of the servers 130 and 140 by sending a request (e.g., a message) to solicit a bid for the impression (e.g., web page 125b).

The servers 130 and 140 may evaluate the impression by directly accessing context information associated with computer 110, browser 115, or a corresponding user (e.g., IP addresses and related demographics, cookie information from past interactions with each of the servers 130 and 140, as well as other information at server 120 provided through script 129, such as information identifying the location of the web page where the impression is occurring). The servers 130 and 140 may then respond with messages providing bids to script 129. The bids may be in any form indicative of an interest to place an ad. For example, the bid may be a simple yes or no indication, a monetary value (e.g., Dollars or Euros), a score, or a prediction of how well the ad will do if placed. The script 129 evaluates the bids and selects an ad to place in the impression (in this case, web page 125b). For example, script 129 may reject both bids and select a default ad previously selected by server 120, select the highest bidder, or select a lower valued bidder (e.g., when a preferred advertiser has a lower monetary bid).

The selected ad may then be provided, either directly as HTML or by reference (e.g., a hyperlink to another server), to computer 110. The browser 115 may then present the selected ad by, for example, rendering the selected ad in a frame of web page 125b. Although the previous example describes the ad as being included within a frame of browser 115, the ad may be presented to a user of computer 110 and browser 115 in a variety of ways including one or more of the following: as a pop-up window, as an email, as a phone call, as visual content, as audio content, embedded in a video, embedded in television, embedded in a mobile device (e.g., a mobile phone or the like), embedded in map data, and any other presentation mechanism. The script 129 thus enables selection of ads on a per impression basis and enables servers to place bids on those ads on a per impression basis. Moreover, since script 129 polls servers 130 and 140, servers 130 and 140 may each directly access the context information independently of other servers. The servers 130 and 140 may thus independently gather whatever information they deem relevant to making a bid.

In some implementations, the server 120 may be implemented as a so-called "publisher" (also referred to as a publisher server or web site) that publishes information content, such as web pages. An example of a publisher is Yahoo, MSN, or any other web site that provides information content. In some implementations, the server 120 may not be a so-called publisher. When that is the case, the server 120 may receive redirects from other servers and then insert, using script generator 127, scripts (e.g., script 129) into a web page that is served to browser 115 or computer 110. The server 120 may also include an ad server for serving ads as well as scripts, such as script 129.

The server 120 may also function as a controller (also referred to as an "active server") that actively controls ad placement. When that is the case, server 120 may use accounting component 128 to track which ads are inserted into web page 125b, so that the appropriate advertiser can be billed for selected ads.

In some implementations, servers 130 and 140 may be implemented as ad servers for advertisers (and advertising networks) bidding on impressions. Moreover, system 100 may provide a real-time bidding exchange that dynamically optimizes the value of each impression. The system 100 allows the advertiser (e.g., servers 130 and 140) to directly access a user's browser 115 and computer 110 using standard Internet protocols, which allow server 110 to obtain various context information that the advertiser would otherwise only have access to after having secured an impression from an ad server.

An example of context information is cookie information previously recorded to computer 110 by another server, such as server 130, during interactions with browser 115. The cookie information may include any information known to the advertiser about the computer 110 or browser 115, such as ads already shown to the user of browser 115, whether a user clicked on any of those ads or completed a sale as a result of being shown one of those ads, websites (affiliated with server 130) that the user has visited or made a corresponding purchase, and the like. Another example of such context information is the IP (Internet Protocol) address assigned to computer 110, which can be used to infer information such as the physical metropolitan area where the computer is located and the type of connection (e.g., a cable modem, DSL (Digital Subscriber Line) line, dialup modem, T-1 line, and the like) being used to connect computer 110 to the Internet (e.g., network 152). Other examples of context information available to the advertiser are the type of operating system being used at computer 110, the type of browser 115 being used at computer 110, the language preference selected at computer 110, and other such technical details about the configuration of computer 110 and browser 115.

Moreover, server 120 may also include information in script 129 that might be relevant to advertisers (or their servers, such as server 130 and 140). The script 129 may provide the information to the advertisers when it calls servers 130 and 140. For example, the relevant information might include information about the web page the user at browser 115 is visiting (e.g., that the web site is a personal finance related page) or other information known by server 120 (and placed in script 129) about the user (e.g., that the user is a 25 year-old male interested in movies).

Figure 2:
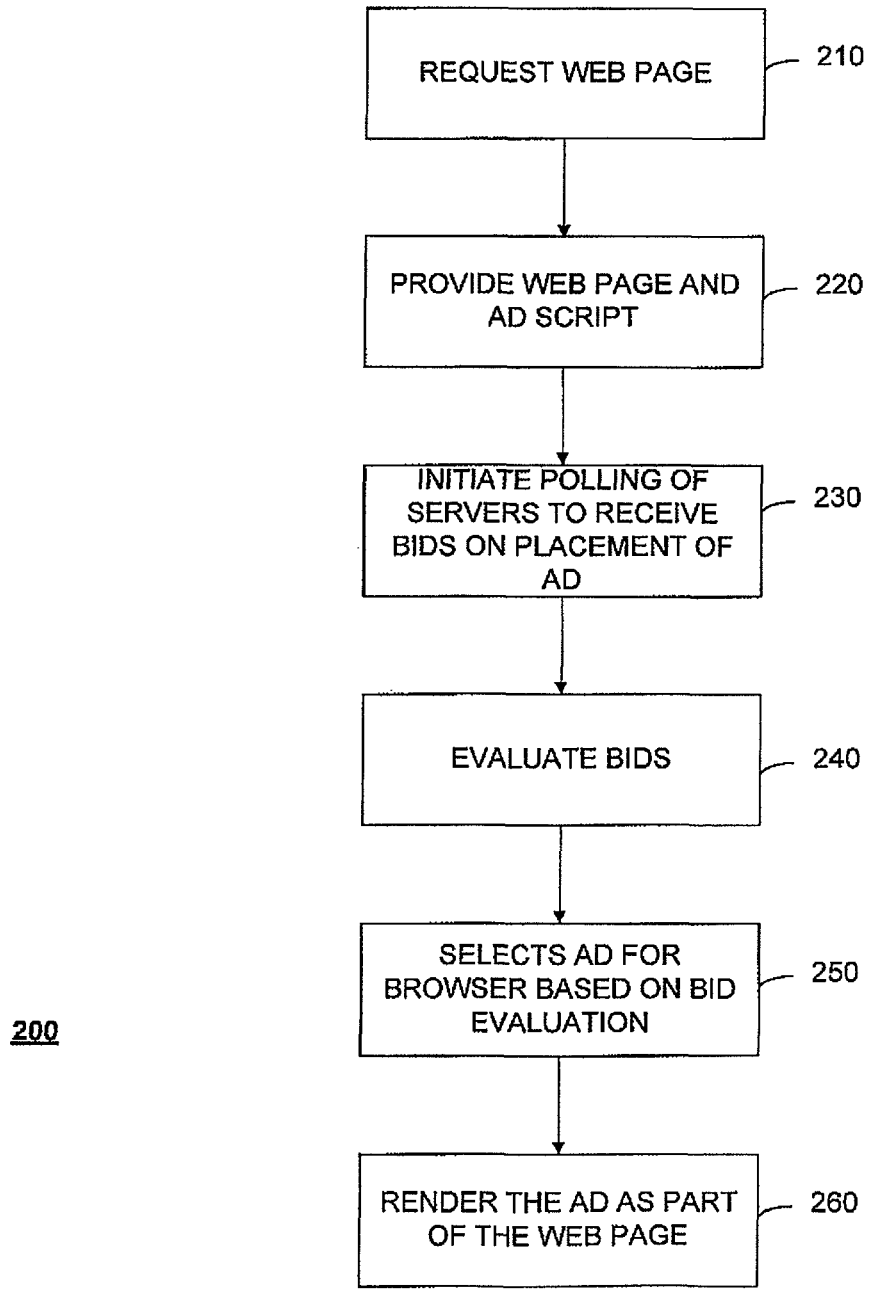
FIG. 2 is a process flow diagram illustrating a method for presenting ads based on bids.

FIG. 2 depicts a method 200 for presenting ads based on bids. Referring to FIGS. 1 and 2, browser 115 requests a web page from server 120 (block 210). At 220, server 120 may respond to the request by providing to browser 115 a web page 125b and a script 129, embedded within web page 125b by script generator 127.

At 230, when web page 125b and script 129 are received at browser 115, script 129 polls one or more servers 130 and 140 to solicit bids for presenting ads associated web page 125b. The script 129 may send one or more messages to poll servers 130 and 140. To enable servers 130 and 140 to assess whether to bid on the impression (e.g., presenting an ad in connection with web page 125b), the messages to servers 130 and 140 may include (or provide access to) one or more of the following: a minimum bid amount, the identity of server 120, the exact page or web site onto which the ad might be served, and context information representative of the user of browser 115 (e.g., identity, demographic information, past interactions with server 120 or other affiliated servers, and past purchases with other affiliated servers known to server 120 at the time it generated script 129). The servers 130 and 140 may then provide bids to script 129. As described above, the bids may be in any form that expresses an interest in presenting an ad. For example, the bid may take one or more of the following forms: a yes indication to present an ad, a no indication rejecting the bid from script 129, and a value in response to the bid message from script 129.

At 240, script 129 evaluates any bids 135 and 145 received from servers 130 and 140, as well as the bid for the so-called default ad provided by server 120 and/or script 129. For example, the default bid may be one (1) cent, bid 135 may be two (2) cents, and bid 145 may be three (3) cents. In this example, script 129 evaluates the three bids and selects server 140 and ad 147. Although the previous example describes evaluating three bids, more or fewer bids may be evaluated as well.

Moreover, script 129 may include a timeout feature, so that a default ad is selected unless an appropriate bid is received from servers 130 or 140 within a predetermined time limit (e.g., ½ second).

At 250, script 129 may select an ad to provide to browser 115. The selection of an ad may include providing the ad, such as HTML content for the ad or, alternatively, a URL (Uniform Resource Locator) link to the ad. The ad may include a call back to server 120 and possibly a call back to server 130 or 140 in order for servers 120, 130, and/or 140 to properly account for the final disposition of the impression.

At 260, the ad (e.g., ad 147) is then rendered at computer 110 and/or browser 115. The ad may take the form of another script as in 220 (but without a web page) provided by server 130 or 140, which initiates another round of bidding to still other servers. When a user selects another web page from web pages 125a, script generator 127 may dynamically embed another script into the other web page.

In some implementations, HTML scripting technology is used to implement script 129, including JSON (JavaScript Object Notation), DOM (Document Object Model), and AJAX (Asynchronous JavaScript and XML). Although the aforementioned technologies may be used, other technologies may be used to implement script 129. The script 129 may also be generated dynamically, i.e., generated for each impression. Alternatively, the script 129 may not be dynamic, but rather included in a server (e.g., a web site) regardless of whether the server includes a script generator 127. When that is the case, the script may request bids from the same servers each time until the script is edited or replaced.

The server 120 may also include a yield optimization component to determine which ad to use as the default ad and which servers should be polled by script 129 when soliciting bids for an impression. For example, the yield optimization component may evaluate the user's or browser's past interactions (e.g., purchases) to determine whether to list in script 129 a server for an ad. A yield optimization component uses any of a number of potential methodologies to evaluate available context information about an impression, historical results for the various available ads, and the various requirements of the potential advertisers to determine which ad should be served for an impression or which ad and bidders should be included in a script, such as script 129. Yield optimization may be implemented as a component of an ad server, and ad servers may make decisions about ads to serve without utilizing yield optimization using any other decision methodologies.

Figure 3:
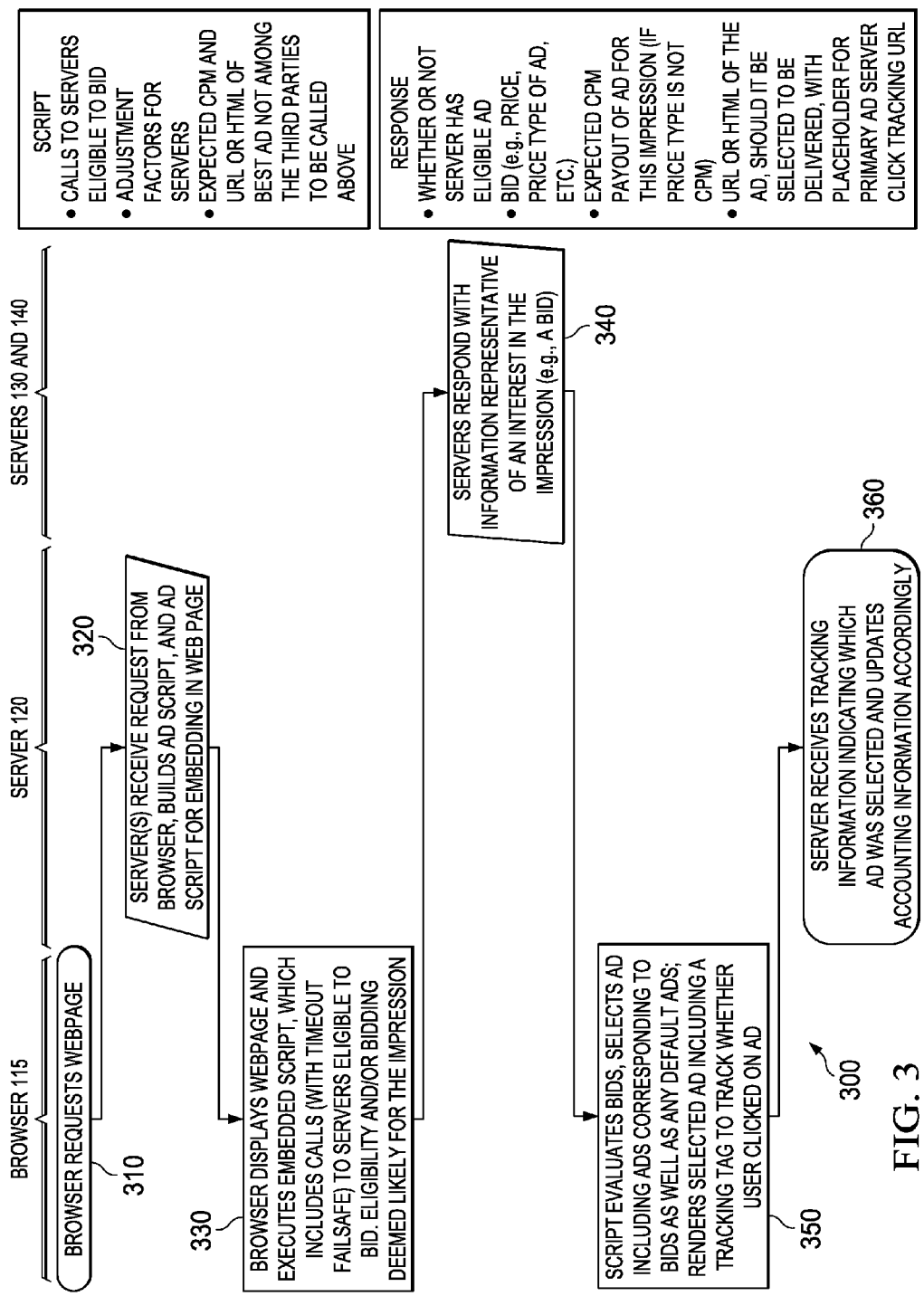
FIG. 3 is a process flow diagram illustrating a method for presenting ads based on bids.

FIG. 3 depicts another method 300 for presenting ads based on bids. At 310, browser 115 requests a web page from a server, such as server 120. In the implementation of FIG. 3, server 120 is implemented as a publisher server that provides web pages to browsers, although other types of servers may be used.

At 320, server 120 may receive the request from browser 115, build script 129 using script generator 127, and return web page 125b and script 129 to browser 115 through network 152. In some implementations, script 129 is generated dynamically for each user request for a web page. When that is the case, server 120 may provide script 129 that is yield optimized for that specific impression. For example, based on the type of impression and the particular user, server 120 may select a default ad with the greatest predicted performance of such ads available to server 120, select bidders most likely to bid on the impression, and include the selected default ad and the selected bidders in script 129. In other implementations, the script 129 is not generated dynamically but rather hard-coded into web pages 125a and 125b.

The script 129 may include the code necessary to perform one or more of the following: polling of the servers (including URLs to locate the servers); receiving bids; evaluating bids; selecting an ad based on the evaluation; and providing (or serving) the appropriate ad content to the browser. The script 129 may also include information about alternative ads should one of the ads from servers 130 and 140 not yield a bid or one of sufficient amount. For example, a default ad may be designated to have a bid value of 5. If bid values of 2 and 4 are received from servers 130 and 140, respectively, script 129 may select the default ad for the impression. The script 129 may also include adjustment factors to be applied to the bids received from servers 130 and 140. For example, a factor may take into account the relative priority for delivery of ads from the different downstream servers 130 and 140 based on factors other than price, such as other elements of the business relationship, past discrepancies in the value of impressions delivered to servers 130 or 140, and the speed that ads are being served from servers 130 and 140. The script 129 may include adjustment factors for different categories of ads. For example, a woman's cosmetic ad may be factored lower than a car tire ad when the impression is for a sports web site. The above-described factors may be used to increase or decrease the value of bids received from servers 130 and 140. The script 129 may also include a URL of a counting web site (or server) to track which ad was selected and any other information desired for tracking ad performance.

At 330, script 129 executes and then calls servers 130 and 140, identified in script 129 as supporting a bid request. The bid request may include information identifying (to servers 130 and 140) the source of the bid request. The bid request may also include (or make accessible) additional information, such as user profile information, cookie information, and the like.

At 340, servers 130 and 140 respond with messages including bids. Before making the bids, servers 130 and 140 receive messages from script 129 (or browser 115) and receive cookies associated with browser 115 and the server receiving the message. The cookies may provide context information, such as the frequency that a browser has seen an ad, user behavior, and other historical information that servers 130 or 140 have known at the time of past communications with computer 110. Each of servers 130 and 140 may then determine pricing (or estimated value) under which they would provide a responsive bid to script 129.

In some implementations, if script 129 provides an estimated price to servers 130 and 140, it may also get the actual price type and price upon which the actual payout will be made. If the price was pre-negotiated on a CPM (cost per thousand impressions) basis, then the response from servers 130 and 140 may be in the form of a yes or no to the impression. Otherwise, the servers 130 and 140 may need to provide an amount with the bids for the impression. But the bid could either be a fixed amount that servers 130 and 140 promise to pay if they get the impression (meaning the bid is also on a CPM basis) or it may just be a soft estimate of how much they will pay. In the case of giving an estimate, servers 130 and 140 may provide the actual price type and price under which the actual payment would be made. Examples of price types include the following: CPM represents a fixed dollar amount per 1,000 impression; CPC represents a fixed dollar amount (cost) per click; CPA represents a fixed dollar (cost) amount per sale (action); CPL represents a fixed dollar (cost) amount per lead; CPV represents a fixed dollar (cost) per view; and CPR (or revshare) represents a fixed percentage of sales value. For example, assume server 130 determines the best ad to serve is an ad for which it will pay $0.25 if the user clicks (e.g., CPC). If the estimated chance that the user will click is 5%, then the estimated value that server 130 will pay for this one impression is $0.0125 (5% multiplied by $0.25, which is a $12.50 CPM). The server 130 is not promising to pay $0.0125 if they get the impression; server 130 is essentially estimating what it is likely on average to pay given a predicted 5% chance of getting a click.

The messages sent at 340 may include one or more of the following: whether or not an ad is available to be placed; the bid (either the actual or estimated amount that will be paid if the bid is won); the actual price type and price should the bid only be an estimate; and a URL or HTML of the ad should it be selected as the winning bid. The servers 130 and 140 may also update (or provide) cookie information at browser 115.

At 350, script 129 evaluates any bids received from servers 130 and 140 by comparing the bids from servers 130 and 140. If the bids from server 130 and 140 do not exceed a threshold value, script 129 may use a default ad identified in script 129 or identified by server 120. Based on the evaluation, script 129 may then select an ad and notify server 120 which ad was selected, so that server 120 and accounting component 128 can track which ad was selected for billing purposes.

In some implementations, script 129 may wait up to a predefined period of time before selecting an ad as part of the bid evaluation described above. If no bids are received within the predetermined time period, script 129 may use a default ad identified in script 129 or identified by server 120.

At 360, server 120 may receive tracking information indicating which ad was selected by script 129. This can be accomplished by having the script send a message from the browser 115 to the server 120 identifying the ad or bidder selected. In addition, the script 129 may include (in the HTML content of the ad or URL link to the ad) an additional URT, that the browser 110 will call in the event that the user clicks on the ad, to facilitate the reporting of such clicks by server 120. The script 129 may also include other information for the advertiser, such as an ID for the advertiser to utilize when reporting back to server 120 any sales that result from serving the ad, in order to track ad performance. In addition, server 130 or 140 may be notified if they are the winning bidder. To that end, servers 130 and 140 may include (in the HTML content of the ad) a URL for browser 110 to call when the HTML content of the ad is served or, alternatively, by counting whether a call at the URL link is received from browser 115. Moreover, script 129 and web page 125b may be implemented in a variety of format including HTML, images, audio, a Flash file, audio, and/or map data.

Figure 4:
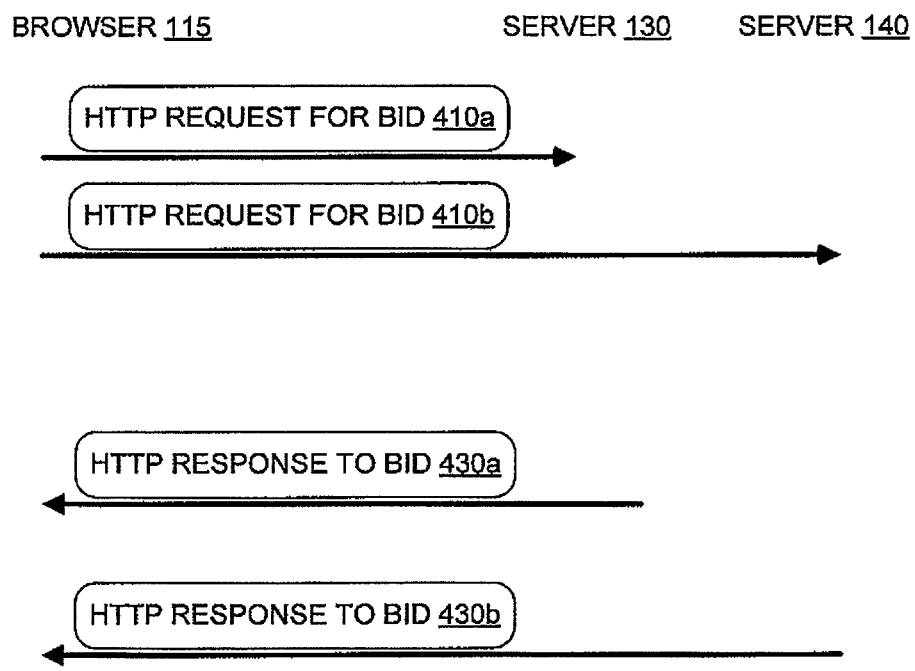
FIG. 4 depicts a messages exchange when bidding for ad placement.

FIG. 4 depicts messages exchanged between browser 115 and one or more servers 130-140. The script 129 at browser 115 sends messages 410a and 410b through network 152 to server 130 and 140. The server 130 is capable of responding to the bid request and thus responds with a message 430a including a bid. The server 140 is also capable of responding to the bid request; server 140 then responds with a response message 430b. The messages 410a-410b and 430a-430b may be received and/or forwarded by one or more of the following: routers, modems, servers, Internet Service Providers, and the like. In some implementations, a response message to a bid request may include information about the bidder's desire to receive more bid requests. For example, the response message may specify a time period for which the bidder does not want to be solicited for another bid. The bid request may include other information that is material to the bidder in preparing a bid response. For example, the bid request may: include information about what type of page or content the user is viewing and/or demographic and past behavioral information known by the publisher about the user; enable a bidder to specify a number of minutes for which they will not be called by the user's browser again for a type of bid; include other miscellaneous information (e.g., information shared with a bidder which may be of help when utilizing the impression); provide the capability to track back what happened in the auction.

Although the above describes only servers 120-140 and computer 110, a plurality of servers and computers may be implemented as well.

Moreover, although the above describes a browser as the user interface to information including ads, other types of user interfaces may be used as well. Moreover, these other types of user interfaces may include script (or code) used to poll servers to solicit bids on ads, receive bids, evaluate bids, select a bid, and/or present the ad of the winning bid, as described above. Moreover, the above-described bidding process may be used in a user interface capable of serving Internet advertisements outside of the browser. For example, the above-described bidding process may be used to select and present advertisements to be displayed within a video or audio player application (e.g. Adobe Flash, Windows Media Player, or iTunes), gaming applications, and calendar applications. In the case of such applications, the script may be embedded as code in the application, so that advertisers can be polled on whether they would like to present an ad. The script (or code) may be used to poll advertisers and an ad may be provided for presentation at the user interface. In the case of a video or audio player application, the ad of the winning bidder may be displayed before, after, or during one or more video or audio programs, and the ad may include one or more of text, graphics, video, and audio.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, script, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input. The computer may be implemented as a processor (e.g., a central processing unit or the like), router, or any other device including a processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the claims.

Broadcast Programming Based Advertisements

Hardware/Software Environment

Figure 5:
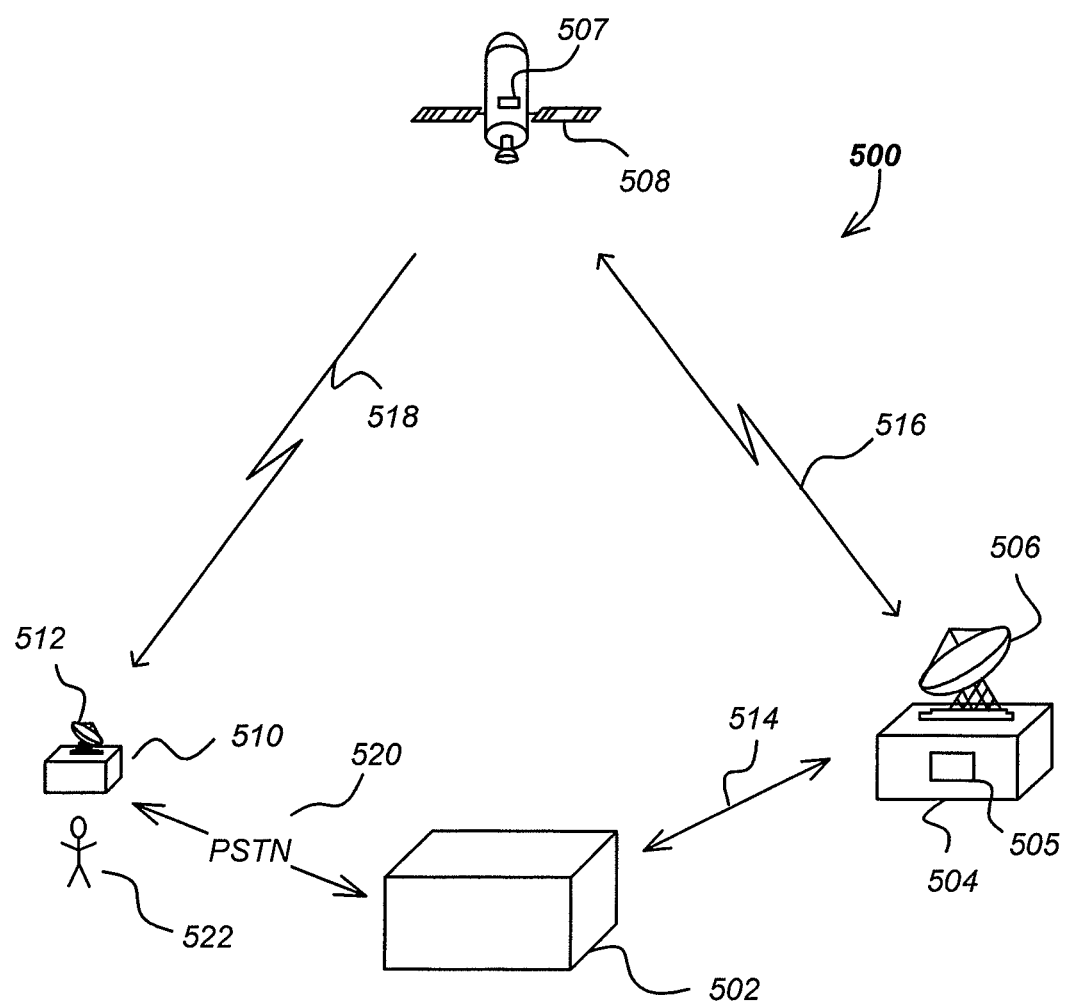
FIG. 5 is an overview of a broadcast programming environment that can be used in accordance with one or more embodiments of the invention.

In addition to the embodiments described above, applications for the auction for individual ad impressions may be implemented in a broadcast programming environment. FIG. 5 is an overview of a broadcast programming environment (e.g., a single satellite video distribution system 500) that can be used in accordance with one or more embodiments of the invention. The video distribution system 500 comprises a control center 502 in communication with an uplink center 504 via a ground or other link 514 and with a subscriber receiver station 510 via a public switched telephone network (PSTN) or other link 520. The control center 502 provides program material (e.g. video programs, audio programs and data) to the uplink center 504 and coordinates with the subscriber receiver stations 510 to offer, for example, pay-per-view (PPV) program services, including billing and associated decryption of video programs.

The uplink center 504 receives program material and program control information from the control center 502, and using an uplink antenna 506 and transmitter 505, transmits the program material and program control information to the satellite 508. The satellite receives and processes this information, and transmits the video programs and control information to the subscriber receiver station 510 via downlink 518 using transmitter 507. The subscriber receiving station 510 receives this information using the outdoor unit (ODU) 512, which includes a subscriber antenna and a low noise block converter (LNB).

In one embodiment, the subscriber receiving station antenna is an 18-inch slightly oval-shaped Ku-band antenna. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The video distribution system 500 can comprise a plurality of satellites 508 in order to provide wider terrestrial coverage, to provide additional channels, or to provide additional bandwidth per channel In one embodiment of the invention, each satellite comprises 16 transponders to receive and transmit program material and other control data from the uplink center 504 and provide it to the subscriber receiving stations 510. Using data compression and multiplexing techniques the channel capabilities, two satellites 508 working together can receive and broadcast over 150 conventional (non-HDTV) audio and video channels via 32 transponders.

While the invention disclosed herein will be described with reference to a satellite-based video distribution system 500, the present invention may also be practiced with terrestrial-based transmission of program information, whether by broadcasting means, cable, or other means. Further, the different functions collectively allocated among the control center 502 and the uplink center 504 as described above can be reallocated as desired without departing from the intended scope of the present invention.

Although the foregoing has been described with respect to an embodiment in which the program material delivered to the subscriber 522 is video (and audio) program material such as a commercial or commercial advertisement, the foregoing method can be used to deliver program material comprising purely audio information or other data as well.

Figure 6:
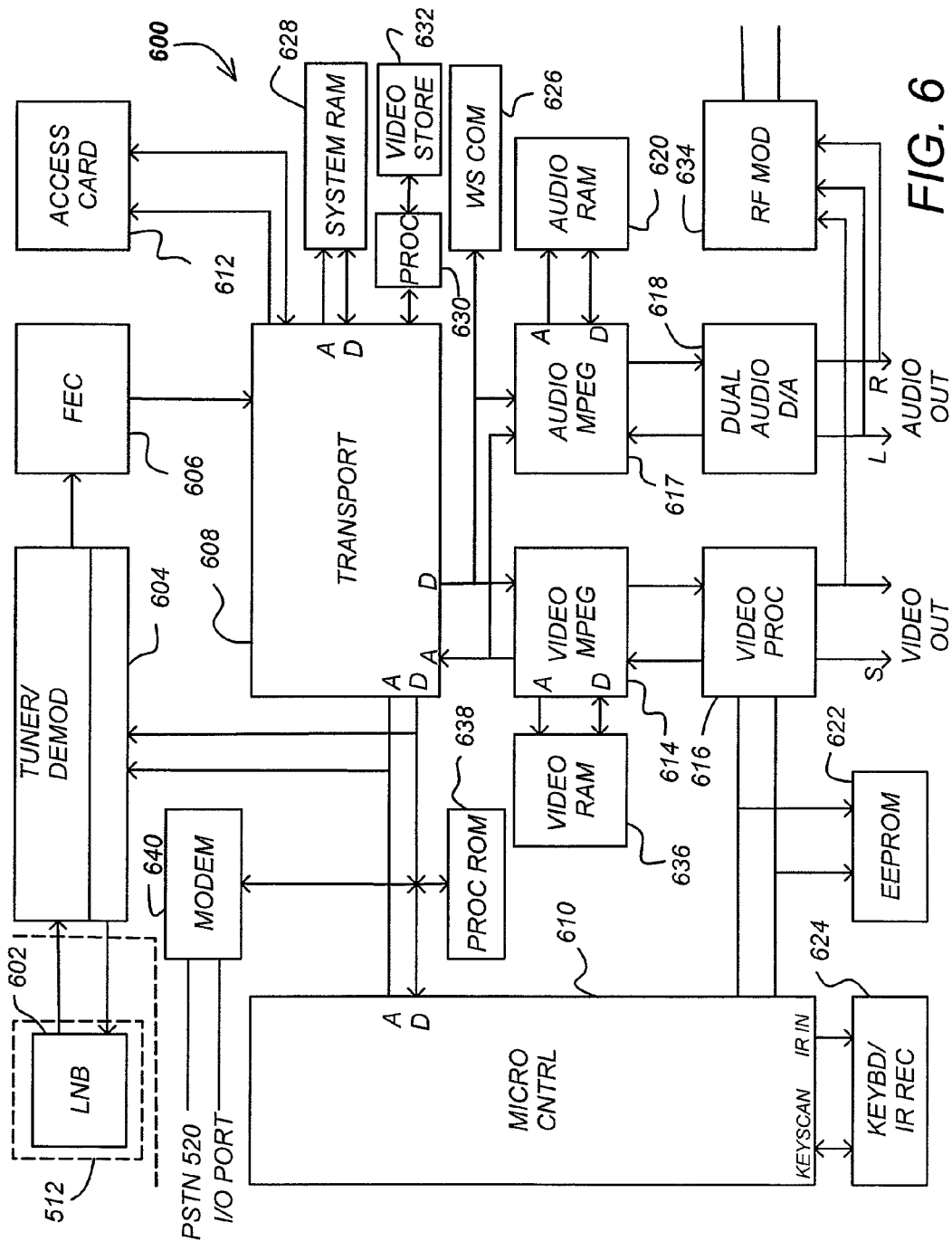
FIG. 6 is a block diagram of an integrated receiver/decoder (IRD) that can be utilized in accordance with one or more embodiments of the invention.

FIG. 6 is a block diagram of an integrated receiver/decoder (IRD) 600 (also hereinafter alternatively referred to as receiver 600 or a set top box). The receiver 600 comprises a tuner/demodulator 604 communicatively coupled to an ODU 512 having one or more LNBs 602. The LNB 602 converts the 12.2- to 12.7 GHz downlink 418 signal from the satellites 508 to, e.g., a 950-1450 MHz signal required by the IRD's 600 tuner/demodulator 604. The LNB 602 may provide either a dual or a single output. The single-output LNB 602 has only one RF connector, while the dual output LNB 602 has two RF output connectors and can be used to feed a second tuner 604, a second receiver 600, or some other form of distribution system.

The tuner/demodulator 604 isolates a single, digitally modulated 24 MHz transponder, and converts the modulated data to a digital data stream. The digital data stream is then supplied to a forward error correction (FEC) decoder 606. This allows the IRD 600 to reassemble the data transmitted by the uplink center 504 (which applied the forward error correction to the desired signal before transmission to the subscriber receiving station 510) verifying that the correct data signal was received, and correcting errors, if any. The error-corrected data may be fed from the FEC decoder module 606 to the transport module 608 via an 8-bit parallel interface.

The transport module 608 performs many of the data processing functions performed by the IRD 600. The transport module 608 processes data received from the FEC decoder module 606 and provides the processed data to the video MPEG decoder 614 and the audio MPEG decoder 617. In one embodiment of the present invention, the transport module, video MPEG decoder and audio MPEG decoder are all implemented on integrated circuits. Such a design may promote both space and power efficiency, and increases the security of the functions performed within the transport module 608. The transport module 608 also provides a passage for communications between the microcontroller 610 and the video and audio MPEG decoders 614, 617. As set forth more fully hereinafter, the transport module also works with the conditional access module (CAM) 612 to determine whether the subscriber receiving station 510 is permitted to access certain program material. Data from the transport module can also be supplied to external communication module 626.

The CAM 612 functions in association with other elements to decode an encrypted signal from the transport module 608. The CAM 612 may also be used for tracking and billing these services. In one embodiment of the present invention, the CAM 612 is a smart card, having contacts cooperatively interacting with contacts in the IRD 600 to pass information. In order to implement the processing performed in the CAM 612, the IRD 600, and specifically the transport module 608 provides a clock signal to the CAM 612.

Video data is processed by the MPEG video decoder 614. Using the video random access memory (RAM) 636, the MPEG video decoder 614 decodes the compressed video data and sends it to an encoder or video processor 616, which converts the digital video information received from the video MPEG module 614 into an output signal usable by a display or other output device. By way of example, processor 616 may comprise a National TV Standards Committee (NTSC) or Advanced Television Systems Committee (ATSC) encoder. In one embodiment of the invention both S-Video and ordinary video (NTSC or ATSC) signals are provided.

Other outputs may also be utilized, and are advantageous if high definition programming is processed.

Audio data is likewise decoded by the MPEG audio decoder 617 (e.g., using the audio RAM 620). The decoded audio data may then be sent to a digital to analog (D/A) converter 618. In one embodiment of the present invention, the D/A converter 618 is a dual D/A converter, one for the right and left channels. If desired, additional channels can be added for use in surround sound processing or secondary audio programs (SAPs). In one embodiment of the invention, the dual D/A converter 618 itself separates the left and right channel information, as well as any additional channel information. Other audio formats may similarly be supported. For example, other audio formats such as multi-channel DOLBY DIGITAL AC-3 may be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microcontroller 610 receives and processes command signals from the remote control 624, an IRD 600 keyboard interface, and/or another input device. The microcontroller receives commands for performing its operations from a processor programming memory, which permanently stores such instructions for performing such commands. The processor programming memory may comprise a read only memory (ROM) 638, an electrically erasable programmable read only memory (EEPROM) 622 or, similar memory device. The microcontroller 610 also controls the other digital devices of the IRD 600 via address and data lines (denoted "A" and "D" respectively, in FIG. 6).

The modem 640 connects to the customer's phone line via the PSTN port 520. It calls, e.g. the program provider, and transmits the customer's purchase information for billing purposes, and/or other information. The modem 640 is controlled by the microprocessor 610. The modem 640 can output data to other I/O port types including standard parallel and serial computer I/O ports.

The present invention also comprises a local storage unit such as the video storage device 632 for storing video and/or audio data obtained from the transport module 608. Video storage device 632 can be a hard disk drive, a read/writable compact disc of DVD, a solid state RAM, or any other storage medium. In one embodiment of the present invention, the video storage device 632 is a hard disk drive with specialized parallel read/write capability so that data may be read from the video storage device 632 and written to the device 632 at the same time. To accomplish this feat, additional buffer memory accessible by the video storage 632 or its controller may be used. Optionally, a video storage processor 630 can be used to manage the storage and retrieval of the video data from the video storage device 632. The video storage processor 630 may also comprise memory for buffering data passing into and out of the video storage device 632. Alternatively or in combination with the foregoing, a plurality of video storage devices 632 can be used. Also alternatively or in combination with the foregoing, the microcontroller 610 can also perform the operations required to store and or retrieve video and other data in the video storage device 632.

The video processing module 616 input can be directly supplied as a video output to a viewing device such as a video or computer monitor. In addition, the video and/or audio outputs can be supplied to an RF modulator 634 to produce an RF output and/or 8 vestigial side band (VSB) suitable as an input signal to a conventional television tuner. This allows the receiver 600 to operate with televisions without a video output.

Each of the satellites 508 comprises a transponder, which accepts program information from the uplink center 504, and relays this information to the subscriber receiving station 510. Known multiplexing techniques are used so that multiple channels can be provided to the user. These multiplexing techniques include, by way of example, various statistical or other time domain multiplexing techniques and polarization multiplexing In one embodiment of the invention, a single transponder operating at a single frequency band carries a plurality of channels identified by respective service channel identification (SCID).

Preferably, the IRD 600 also receives and stores a program guide in a memory available to the microcontroller 610. Typically, the program guide is received in one or more data packets in the data stream from the satellite 508. The program guide can be accessed and searched by the execution of suitable operation steps implemented by the microcontroller 610 and stored in the processor ROM 638. The program guide may include data to map viewer channel numbers to satellite transponders and service channel identifications (SCIDs), and also provide TV program listing information to the subscriber 522 identifying program events.

The functionality implemented in the IRD 600 depicted in FIG. 6 can be implemented by one or more hardware modules, one or more software modules defining instructions performed by a processor, or a combination of both.

Bidding in the Broadcast Programming Environment

Embodiments of the invention may provide the ability to utilize the real-time bidding mechanism described above in the broadcast programming environment. Programs are delivered via traditional broadcast of the signal (e.g., via control center 502 to uplink center 504, to satellite 508, to subscriber receiver station 510). Programs/content may also be delivered by sending a stream to a particular household (e.g., via video on demand or when using digital video recorder [DVR] type controls served remotely). In a DVR based system, media content may be stored in video store 632 in an encrypted/unencrypted form that is viewed by the subscriber 522. Such content may be embedded with signals/metadata that identify when dynamically replaceable segments begin and end. Such metadata would be present regardless of whether the program is live from the source (e.g., watching an 8:00 PM EST program at 8:00 PM EST) or watching on demand or time shifted or DVR-type controlled (pause/rewind) programming Accordingly, in embodiments of the invention, video can be played or transmitted over the Internet (e.g., via a website that provides or enables access to such content or via packets to a set top box [e.g., a DVR system that downloads video from the Internet or video on demand services via broadband]).

The signal/metadata can contain information such as the length of time and other restrictions. The IRD 600 would then submit requests to potential advertisers or advertising companies (may be referred to as networks or aggregators) requesting bids for the advertising time. The request may also contain additional information such as the geography and anonymous (or non-anonymous) information about the household (e.g., age, gender, income level, interests, etc.). The request may be received by the actual cable or satellite provider (e.g., internet protocol based services such as U-VERSE™ or FIOS™) that would then syndicate out the requests to the advertising company. Alternatively, the IRD 600 may contact the advertising companies directly. If the cable/satellite provider is contacted, the provider could optionally make the decision as to the winner and transmit instructions back to the IRD 600 (e.g., via downlink 518 or via PSTN 520) to deliver the advertising. Alternatively, the IRD 600 itself may render a decision as to the winner of the bid and retrieve (e.g., from storage 632, from the designated location provider by the advertiser, as broadcast, etc.).

Bid requests and responses may be sent via a two-way cable interface (e.g., PSTN 520). Such bid request/response may be as IP packets or alternative methods that the IRD 600 utilizes to communicate upstream to the provider. Alternatively, a separate Internet connection from the IRD 600 may be utilized, such as through an Ethernet port or WiFi™ connected to the subscriber receiver station 510 home network (e.g., used to support video download, etc.). In yet another embodiment, a two way satellite communication mechanism may be utilized such as through a satellite based Internet connection.

Further, the IRD 600 may provide a mechanism for the user to access the Internet and display resulting information on a television device. In such an embodiment, the IRD 600 may include both satellite/cable boxes or game/system consoles such as the XBOX™, PLAYSTATION™, or NINTENDO WII™. Embodiments of the invention may simply leverage off of such an existing Internet connection (e.g. using an already established TCP/IP connections) to both communicate with advertisers and/or to deliver advertisements. Alternatively, a new separate Internet connection may be utilized (i.e., a separate TCP/IP connection) for the bidding communications. In yet another embodiment, any household Internet connection may be utilized by the IRD 600 for the bidding communications.

Once the auction is complete, the IRD 600 may then request and receive a video stream from the advertising company for the period of time of the advertisement. Such a stream may be processed as described above with respect to FIGS. 5 and 6 or in an alternative distribution mechanism (e.g., using a new or existing Internet connection).

Further, embodiments of the invention may be implemented with a DVR. In such an embodiment, there is an additional option to pre-stage advertising videos (e.g., in video store 632). Such pre-staging may be useful when video content or advertising cannot be streamed (e.g., with older cable networks or some satellite based embodiments). To pre-stage advertising content, the advertising companies may provide/deliver the advertisements (that the advertising company will bid for placement) ahead of time and the IRD 600 will store such content into a reserved (e.g., hidden) space on the DVR (e.g. in video store 632 in encrypted form). Such storage and processing may be optimized by maintaining a knowledge base regarding desired targeting (e.g., potential recipients/subscriber receiver stations 510 that the bidder will bid for placement of an advertisement/impression) and only loading/pre-staging advertisements onto the DVRs of subscriber receiver stations 510 that the advertising company will be bidding for with that particular advertisement. Bidding may then occur as planned.

Alternatively, the advertisement may take many different forms (i.e., other than strictly video or audio content. For example, the advertisement may be displayed outside of the content itself. In this regard, content may be displayed inside of a frame and the advertisement may be displayed on the frame itself all around the content. Such an advertisement could be anything (e.g., text, video, static images, etc.). Such an advertisement may be enabled via an application for/by the satellite/cable television broadcast provider. Accordingly, once the auction is complete, the IRD 600 may request and receive (or retrieve from a pre-staged area) the advertisement in whichever form it is to be displayed to the user.

To enable the bid processing as described above, the microcontroller 610 in IRD 600 may be utilized to process the bidding instructions. Such bidding instructions may be permanently stored in ROM (e.g., ROM 622) or may be stored in CAM 612 and then processed within IRD 600. Alternatively, a processor may exist within CAM 612 that can be configured to process the bidding application. Further, the actual advertisements may be stored within CAM 612.

Thin-client Device Based Advertisements

As used herein, thin client devices include cellular devices, cellular phones, personal digital assistants, music players (e.g., IPOD™, IPOD TOUCH™, Blackberry™), WinCE™ devices, or any small handheld type devices with a limited or full processing capabilities. Traditionally, such hand-held devices are limited in their processing and memory capabilities. However, this invention is not intended to be limited to such devices and is intended to include any small or handheld devices regardless of their processing capabilities or memory capacity. The description herein is also directed towards the exemplary cellular/wireless phone based environment. However, embodiments may also be implemented in any type of network or system capable of transmitting content and advertisements.

Figure 7:
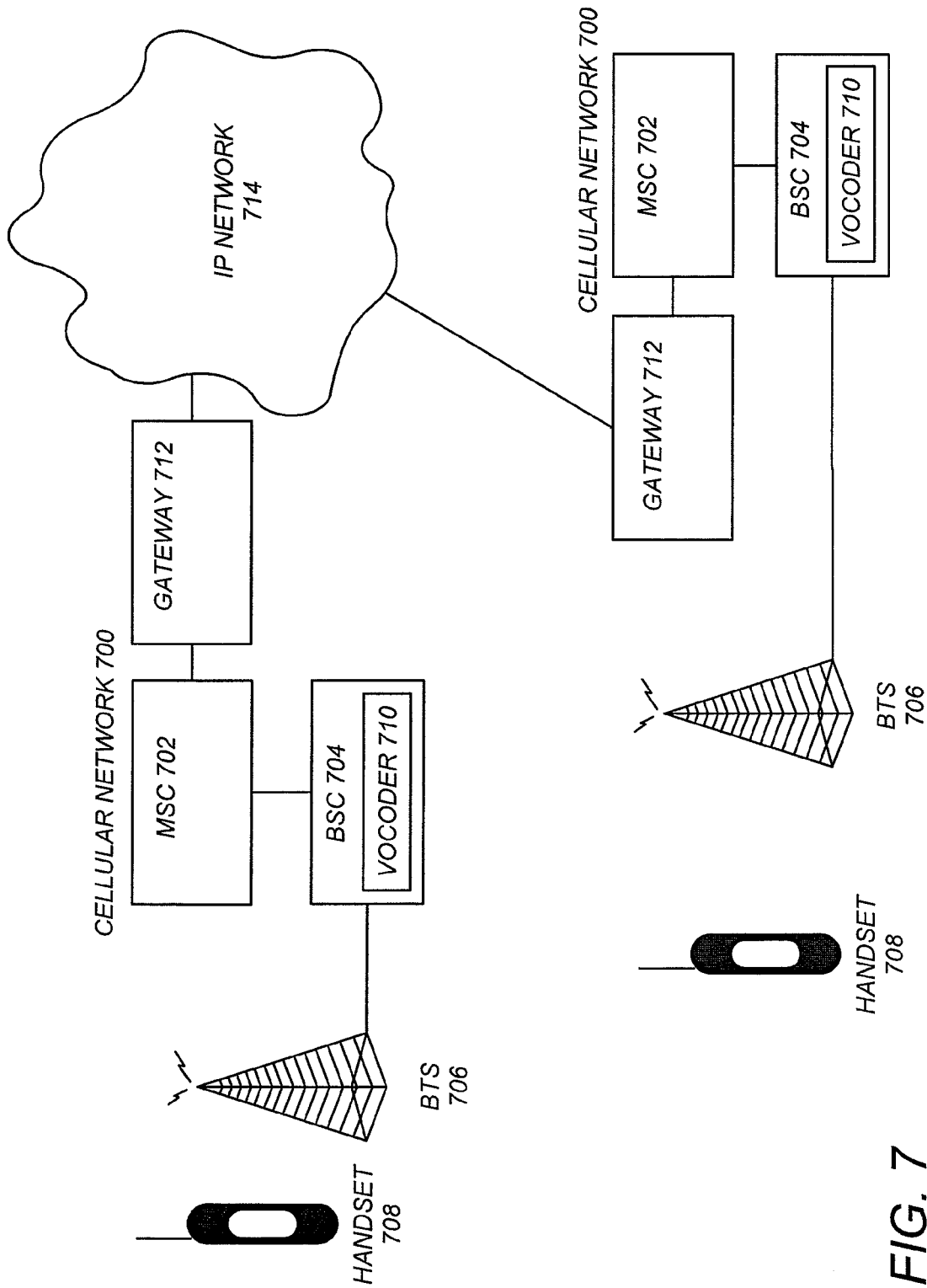
FIG. 7 illustrates an exemplary network configuration that could be used to provide inter-network communications in accordance with one or more embodiments of the invention.

FIG. 7 illustrates an exemplary network configuration that could be used to provide inter-network communications. This exemplary network configurations may be comprised of interconnected cellular networks (e.g., AMPS, GSM, TDMA, or CDMA cellular networks), public land mobile networks (PLMNs), public switched telephone networks (PSTNs), and Internet Protocol (IP) networks.

In the example of FIG. 7, a cellular network 700 includes at least one MSC (Mobile Switching Center) 702, at least one BSC (Base Station Controller) 704, and at least one BTS (Base Transceiver Station) 706 for communicating with one or more handsets 708 or other transceivers. The BSC 704 includes a vocoder 710 for encoding and decoding voice signals received from and sent to the handset 708.

The MSCs 702 of two different cellular networks 700 each connects to a separate Gateway 712 that interfaces into an IP network 714. In this manner, the cellular networks 700 communicate across the IP network 714. Also, in one embodiment, the cellular networks 700 themselves may be IP networks.

Video applications may be utilized on any thin client devices including handsets 708. Further, video may be streamed to such thin client devices using the cellular network 700 or other IP network. Commercials and/or advertisements may be streamed at the beginning, middle, or end of such a video stream (e.g., similar to traditional television advertisements). Internet access may also be provided to thin client devices (e.g., via cellular network 700 to handsets 708, or via a WiFi or cabled connection). Such an Internet connection may be utilized to deliver advertisements/advertisement impressions/commercials to thin client devices.

Further, advertisements that are displayed on such thin client devices may be ads within/or enabled by various applications on/for the browser on the thin client device. For example, a live map application showing the user's proximity to various restaurants may send out an RTB request noting the user's exact location and interest in restaurants asking for bids from advertisers (like local restaurants) wishing to show an advertisement across the bottom of the map to this user. Such an advertisement may constitute a discount coupon valid for the subsequent sixty (60) minutes to a restaurant one (1) block away. Accordingly, similar to the broadcast programming environment, the advertisement may not be limited to an audio/video form but may be displayed in a frame around an application and may consist of text, video, static images, etc.

In addition, bidding software (e.g., a script or application) may be installed or transmitted to the thin client device (e.g., using an existing Internet connection or as part of content that is streamed to the thin client device). Similar to the transmissions described above, the bid process may be directly invoked from the thin client device to obtain bids from one or more advertisers. The bidding communications between thin client device and advertiser may be utilized via an Internet connection of the thin client device (e.g., via cellular network 700). In this regard, applications on thin client devices enable the dynamic real-time bidding for advertising as described above.

In yet another embodiment, a remote feature activation message may be utilized to either invoke the bidding process or receive a selected advertisement. To better understand how remote feature activation messages operate, a more detailed description of cellular phone services is useful.

Figure 8:
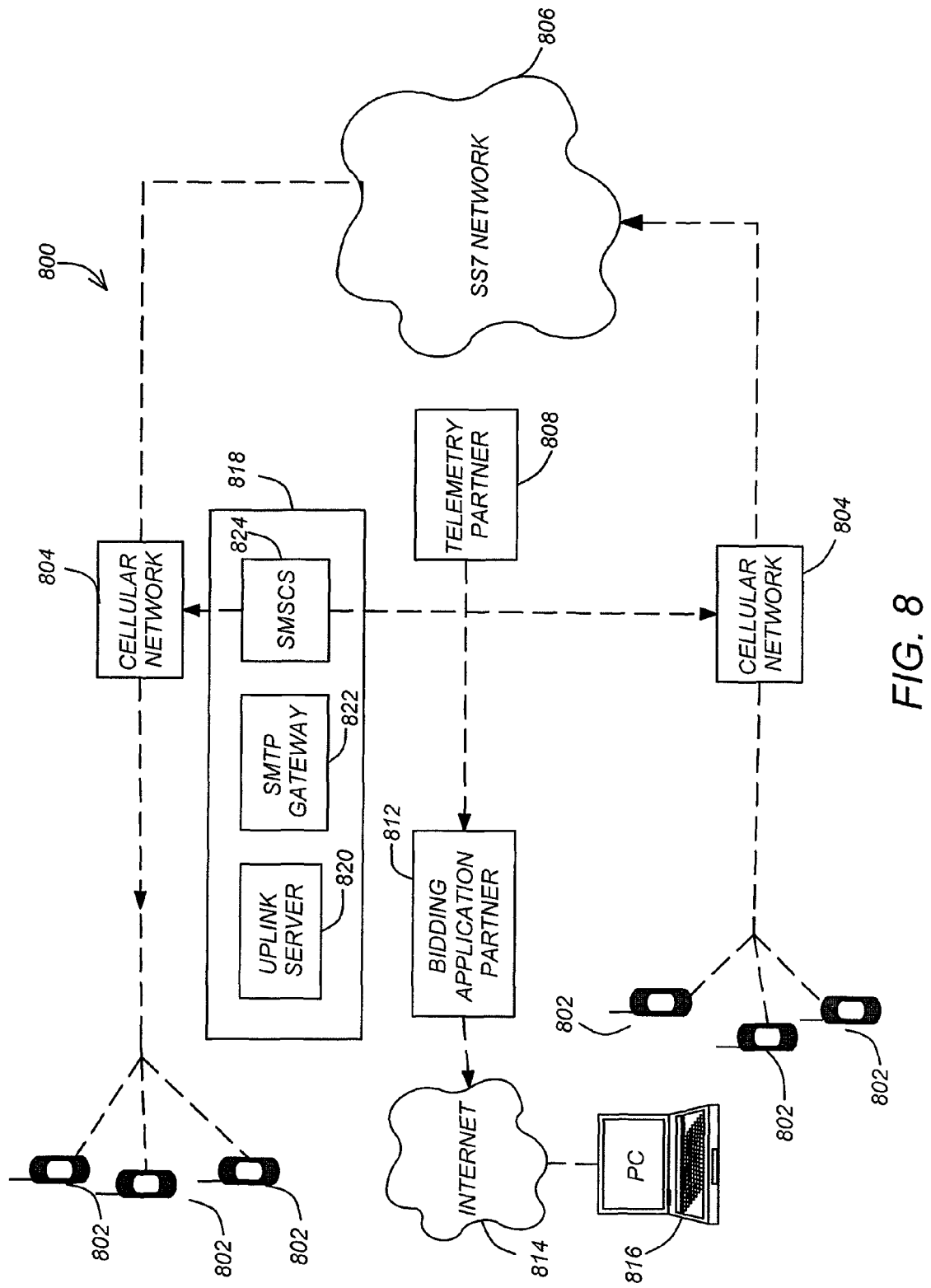
FIG. 8 illustrates a phone system utilized in accordance with one or more embodiments of the invention.

FIG. 8 illustrates a phone system 800 in accordance with one or more embodiments of the invention. The cellular phones/handsets 802 are interconnected and controlled by a central Mobile Telecommunications Switching Office (MTSO) across a signaling system 7 (SS7) network 806. The MTSO is basically a telephone switching office as far as hardware is concerned, but includes a substantial amount of additional digital equipment programmed for cellular control. The MTSO not only connects the system 800 to the land telephone network (the SS7 network 806), but also records call information for billing purposes. SS7 is the protocol used in the public switched telephone system for setting up calls and providing services. SS7 sets up and tears down the call, handles all of the routing decisions, and supports all modern telephony services such as 800 numbers, call forwarding, caller ID, and local number portability (LNP).

A cellular network 804 provides cellular service in a particular region or area and may include one or more MTSOs to provide the cellular service. A cellular phone 802 is associated with a particular cellular network 804 as a home location/area. When a cellular phone 802 is taken outside of the home location or into another cellular network 804 area, the cellular phone 802 is "roaming" The interim standard-41 (IS-41) is the protocol for passing cellular subscriber information from one carrier/cellular network 804 to another to provide roaming capabilities. Accordingly, IS-41 allows mobile travelers to roam across the country.

A message must be sent from a cellular phone 802 to the phone's 802 serving home location register before service is allowed when roaming Such a message registers the phone in the foreign cellular network 804. When the cellular phone 802 is taken into a foreign cellular network 804, a message is transmitted to an MTSO in the foreign network 804. The foreign network 804 recognizes that the cellular phone 802 is from a different network and requests validation of the phone's 802 service from the phone's 802 home cellular network 804. Once validated, the cellular phone 802 is permitted to make and receive calls while in the foreign network 802.

Various methods of transmitting and various types of telemetry messages may leverage the IS-41 protocol and SS7 network to provide the bidding system in accordance with embodiments of the invention. A telemetry message such as a registration notification message or remote feature activation message may be utilized to initiate a real-time dynamic bid/auction process on cellular network 804. When a cellular phone 802 moves to a different cellular network 804 or powers on or off the cellular phone 802, a telemetry message is delivered to the appropriate cellular network 802. Once a cellular network 804 receives a telemetry message, the message can be forwarded, reformatted, or generally acted upon in some manner.

In one embodiment of the invention, a remote feature activation telemetry message is transmitted. A remote feature activation message comprises data encoded in a field (e.g., a dialed digits field) of a message. With the remote feature activation message, a fictitious area code (e.g., 175) is programmed into a cellular phone/radio 802. When attempting to send data, the fictitious area code is preceded by the star character (*) (e.g., *175). This combination identifies to the cellular system 804 that the customer desires to activate or deactivate a feature (e.g., call forwarding, call waiting, etc.). Since a fictitious area code is used (i.e., an area code other than the cellular network's 804 area code), the cellular network 804 interprets the cellular phone 802 as a roaming cellular phone 802 desiring to activate or deactivate a feature (e.g., call forwarding, call waiting, etc.). Since a fictitious area code is used (i.e., an area code other than the cellular network's 804 area code), the cellular network 804 interprets the cellular phone 802 as a roaming cellular phone 802 desiring to activate/deactivate a feature and routes the message (*XX175 followed by data) over the SS7 network 806 to the cellular phone's 802 home cellular network 804/location register. The home cellular network 804 is identified by the area code. Accordingly, an independently maintained system 804, at the specified area code, that provides the bidding system functionality is forwarded the telemetry message. By leveraging the fact that a request has to go to the serving home cellular network 804, data (e.g., advertising content, location, user information, bidding information, etc.) may be added into the telemetry message.

While messages are being transmitted to and from cellular phone 802, a unique message is sent from the foreign cellular network 804 to a telemetry partner's 808 home location register (HLR) (e.g., in the area code or home cellular network 804 specified by the telemetry message) that contains information regarding the bidding/auction as well as the cellular phone number of that customer. The message is forwarded to a bidding application partner 812 (e.g., advertising server, web publisher, etc.) 812.

Accordingly, the remote feature activation message or an application on a mobile device 802 or thin client may enable an auction for advertising that is displayed or played back on the mobile device 802 or thin client. Such advertising may be audio, video, or a single frame (e.g., a single image or impression) that is displayed as part of content on the thin client device (e.g., on a media content application executing on the thin client device [such as an internet browser, video player, or other application]). Further, such bidding and messages occur in real time on a dynamic basis (as described above).

Server-to-Server Real-Time Bidding

As an alternative to the above-described embodiments, the advertisement and bidding process may occur in real time/dynamically between two servers 120-140. In other words, the dynamic real-time bidding process may operate between an end-user device (e.g., thin client device, set-top box, web-browser, etc.) and a server 120-140, or between two servers 120-140. In a server-to-server based environment, a request for a web page is received from a user (e.g., via a set top box, thin client device, web browser, etc.) at a server (e.g., web-site host, web publisher, cellular network 700/804, control center 502, uplink center 504, etc.). Rather than basing the inserting of an advertisement on advance bids provided by other servers 130-140, the server 120 initiates a real-time bid/auction for an impression to be served to the user.

The real-time/dynamic bid/auction may transmit a variety of types of information to the servers 130-140 to solicit the bids. Such information may include information about the user (e.g., prior bidding experiences known by the server 120, particular user based information based on a cookie, IP address information, GPS based location, etc.). Further, the server 120 may attempt to provide servers 130-140 with as much information as possible to allow servers 130-140 to determine the identity of the user or as much information In view of the above description and flow chart illustrated in FIG. 3, a server-to-server based embodiment enables server 120 to perform the prior browser based steps of 330, 350, and 360. Accordingly, in addition to user based information, server 120 may execute calls to numerous servers 130-140 that are eligible to bid (with timeout failsafe). Servers 130-140 respond to server 120 with information representative of an interest in the impression (e.g., a bid) at 340. Such a bid indicates whether the server 130-140 has an eligible ad, the actual bid (e.g., price, price type of ad, etc.) the expected CPM payout of the ad for this impression (if the price type is not CPM), an a URL or HTML of the ad (should the ad be selected to be delivered, with placeholder information for primary ad server click tracking URL).

At 350, the server 120 evaluates bids, selects one or more advertisements to utilize in the impression (including advertisements corresponding to bids as well as any default ads), and inserts the appropriate information into the information/page (e.g., into the streamed content, static web page, dynamic web page, broadcast program, etc.). The information/page is then delivered to the user in the appropriate format (e.g., via a cellular network, internet transmission, broadcast, etc.). The end user then displays the information (e.g., on the thin client device, television, LCD monitor, etc.).

Accordingly, rather than merely basing the advertising that is used for an impression on advanced bids that are made by servers 130-140 without real-time information about the user that will be viewing the advertisement, embodiments of the invention provide the ability to conduct a real-time bid/auction that is conducted dynamically with the user's request for the advertisement. The bidders receive information useful to optimize their return on investment (by utilizing the end-user's information to better predict a response to the advertisement), and bids are executed via real-time exchange between multiple servers. Such an embodiment would not require the use of a script (e.g., with the bidding information) or other program that is inserted into content that is transmitted to the end user. Instead, the server 120 controls the bidding process and merely delivers the content that includes the impression (from the winning bidder).

Logical Flow for Real-Time Bidding (RTB)

Figure 9:
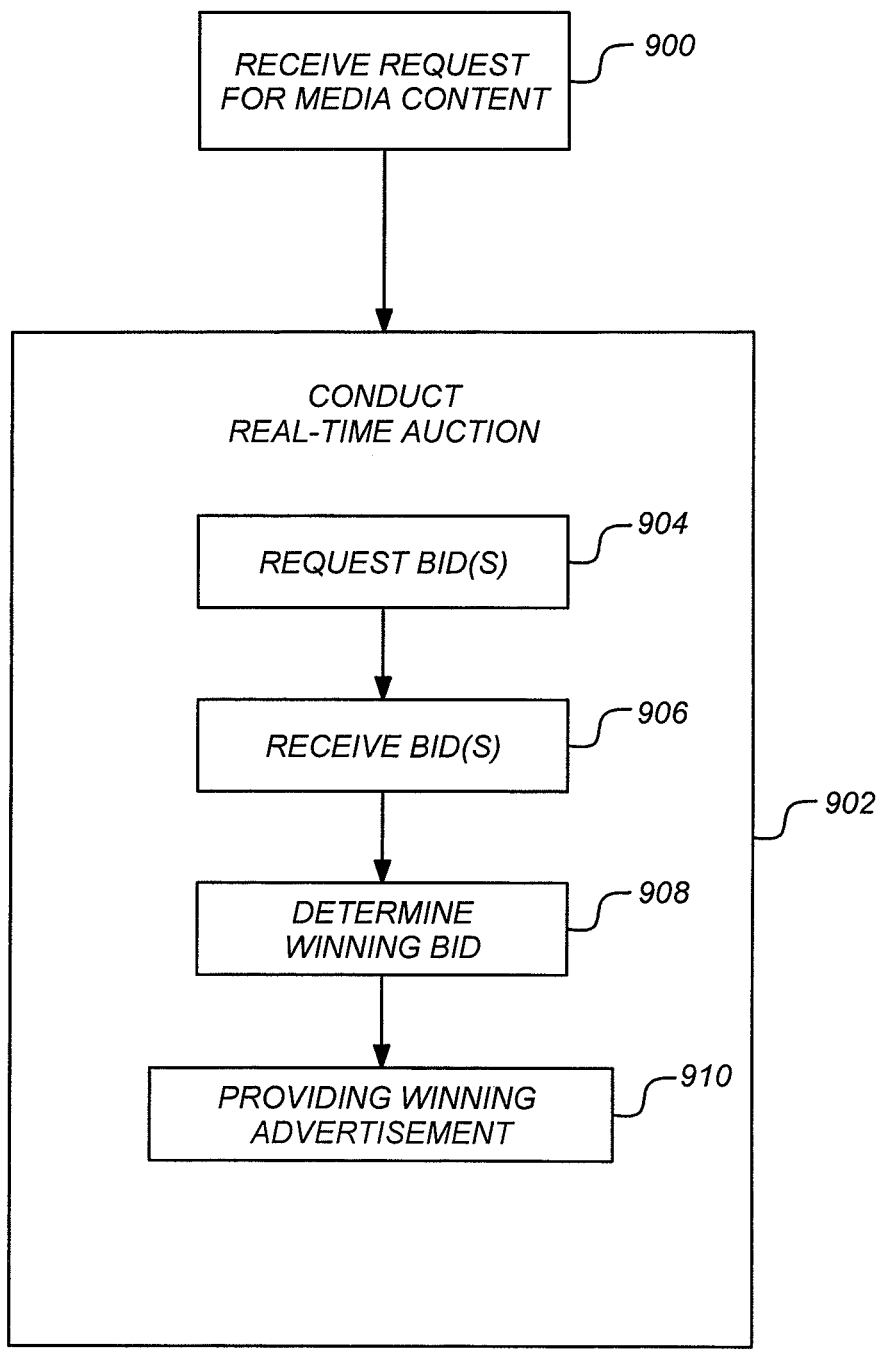
FIG. 9 is a flow chart illustrating the logical flow for selecting media content (e.g., an advertisement) to be displayed by a user in accordance with one or more embodiments of the invention.

FIG. 9 is a flow chart illustrating the logical flow for selecting media content (e.g., an advertisement) to be displayed by a user in accordance with one or more embodiments of the invention. At step 900, a request is received, from a particular user device, for media content. Such a request may be received by a user device itself (e.g., a subscriber receiver station, thin client device, web browser, etc.). Alternatively, the request may be received by a content provider (i.e., from a user device).

At step 902, in response to the received request, a real-time auction, for an advertisement to be displayed with the media content via the particular user device, is conducted. The real-time auction can be conducted between a server and the bidders or between the end-user device and the bidders. For example, a content provider that receives the request for the media content (from the particular user device) may conduct the auction directly with the one or more bidders. Alternatively, the content provider may receive the request for media content and provide/transmit instructions/information that enables the particular user device to dynamically conduct the real-time auction. What is noteworthy in both situations is the fact that the auction is being conducted dynamically in real-time after the request for media content has been received. In other words, the auction is not conducted in advance of receiving the media content request. In this regard, information about the particular user device that will be displaying/playing the advertisement may be utilized by the bidders to determine the appropriate bid.

As illustrated in FIG. 9, such an auction includes steps 904-910.

At step 904, a bid is dynamically requested from one or more bidders for an advertisement to be presented on the particular user device.

At step 906, one or more bids are received in real-time from the one or more bidders.

At step 908, a determination is made regarding which of the bidders has won the auction based on the bids received.

At step 910, a winning advertisement is provided to be displayed with the media content.

In one or more embodiments, the particular user device is a subscriber receiver station (e.g., in a cable or satellite broadcast based system) and the request for media content is received at 900 by a broadcast programming provider. In response to the request for media content, the subscriber receiver station receives broadcast media content from the broadcast programming provider that includes an advertising signal identifying a dynamically replaceable segment of the media content. The subscriber receiver station then conducts the real-time auction at step 904 by communicating directly with the bidders based on the advertising signal received. In addition, rather than receiving the advertisement in real-time (or in addition to such transmission/broadcast in real-time), the subscriber receiver station may pre-stage the advertisement.

As an alternative to the subscriber receiver station conducting the real-time auction, the auction may be dynamically conducted in real-time by the broadcast programming provider who communicates directly with the bidders to select the winning bid/advertisement. The provider could then either broadcast the media content including the winning ad to the subscriber receiver station, transmit the ad directly to the subscriber receiver station, or broadcast the media content with a signal identifying the dynamically replaceable segment along with an identification of the winning ad for the subscriber receiver station to insert and display to the user (e.g., on a display device such as a television or monitor).

In yet another embodiment, the particular user device may be a thin client device (e.g., a cellular phone, PDA, IPOD Touch™, etc.) where the real-time auction is conducted over a cellular network. The media content could then be displayed on the thin client device using a media content application executing on the device (e.g., a web browser, application, etc.). Such a real-time auction may be initialized using a remote feature activation message transmitted by the thin client device.

Managing Advertisement Impression Bids

As described above, in addition to conducting a real-time bidding (RTB) auction where the particular impression is known to the bidding advertiser in advance of the bid submission, many auctions may be conducted on a "dynamic pricing", "fair market value", or "2nd price auction" basis, where the advertiser offers to pay one price in an asynchronous auction (bids are placed ahead of the impressions actually occurring). The bid price could be on a CPM (cost per thousand impressions), CPC (cost per click), CPA (cost per action such as a purchase) or other basis. This bid price represents a maximum price. If the bid price is not a CPM price, the bid price may be converted to a predicted CPM based on past experience using a proprietary algorithm of that platform. An advertisement is selected (e.g., the highest such CPM, but other factors such as pacing come into play). The bid price for the selected advertisement is compared to the next highest such bid plus some spread (e.g., plus 5% or plus $0.05) and a ratio is computed between this and the original CPM for the winning ad. The price actually charged is the lower of the actual bid or the actual bid multiplied by this ratio. Alternatively, the price charged might be some fixed percentage of the amount between the first and second price (e.g. halfway between the two or 100% of the second price). In yet another embodiment, the price charged may be the lesser of a fixed percentage above the price of the second bid and the first bid. In the event that the bid price is not a CPM price, the price charged may be converted back to the original type of price.

A first market that has conducted the above second price auction may then attempt to secure an advertising impression for the winning bidder in another marketplace. As described above, problems may arise because when the winning bid amount is submitted from the first market to the second market, there is a discrepancy between the price paid for the winning amount and the amount the winning bidder would be willing to pay. This discrepancy may allow a new bidder to win the second price auction (or RTB auction) in the second marketplace despite the fact that the original winning bidder had offered a higher bid than the new bidder.

Figure 10:
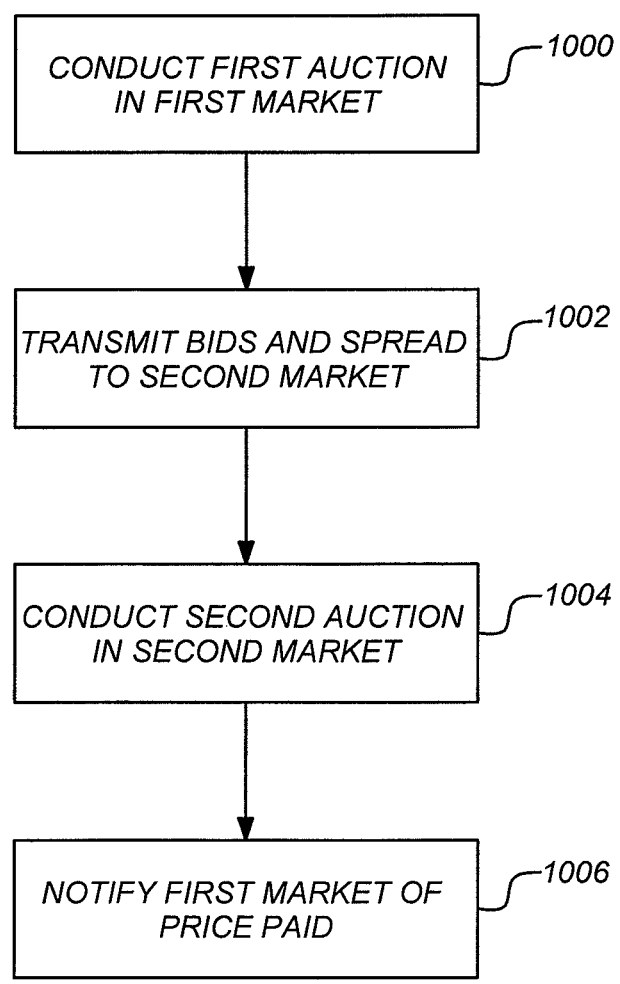
FIG. 10 illustrates the overall logical flow for conducting an auction across multiple markets in accordance with one or more embodiments of the invention.
Figure 11:
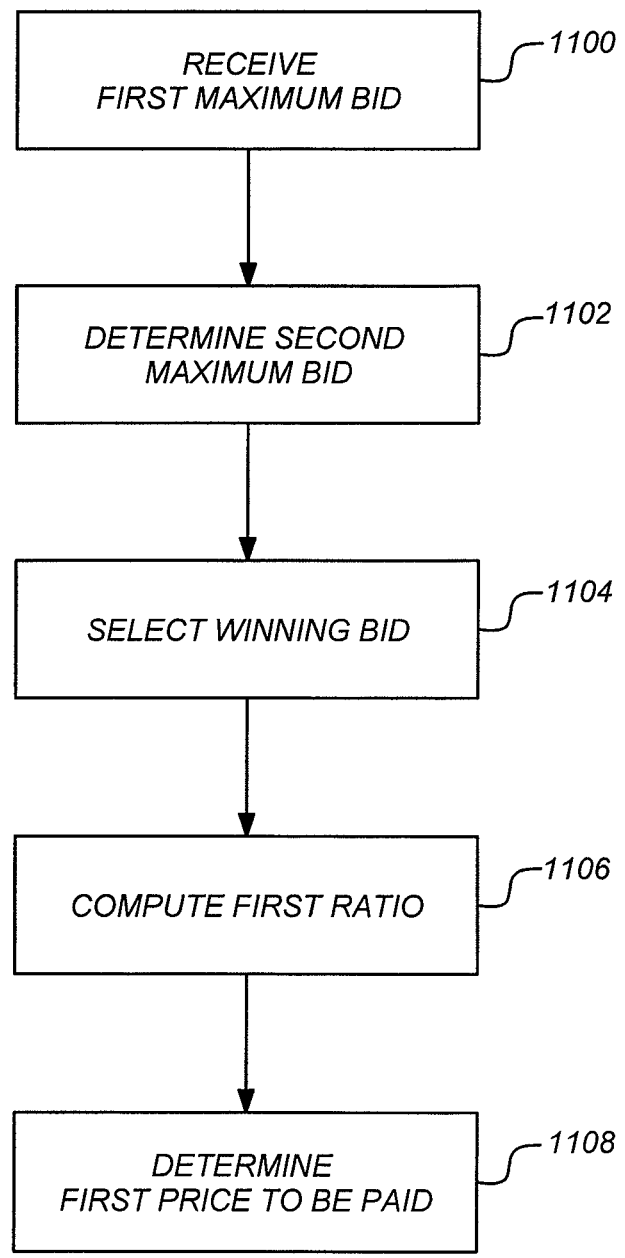
FIG. 11 illustrates the details for conducting the first auction of step 1000 of FIG. 10 in accordance with one or more embodiments of the invention.
Figure 12:
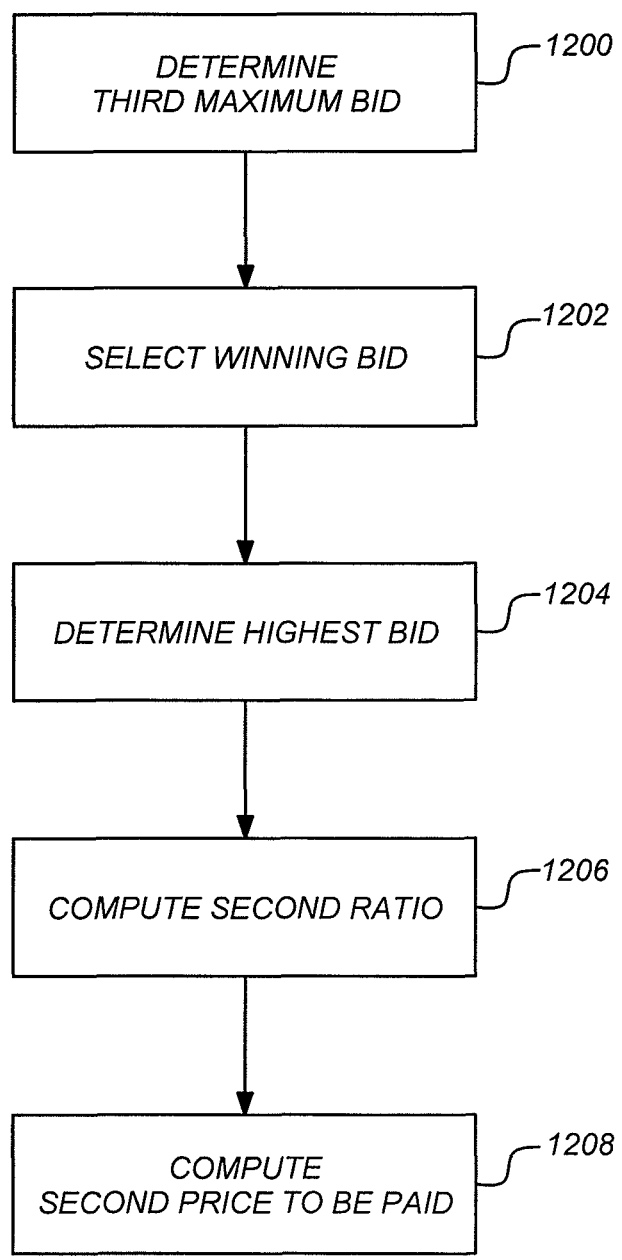
FIG. 12 illustrates the logical flow for conducting the second auction in accordance with one or more embodiments of the invention.

One or more embodiments overcome the problems of the prior art by requiring or obtaining agreement from the second market to respect the first market's rules for second price auctions, or by the two markets agreeing to other rules to govern the second price auction that allows the original bidder to win. FIGS. 10-12 illustrate the logical flow for conducting an auction for advertising in accordance with one or more embodiments of the invention.

FIG. 10 illustrates the overall logical flow for conducting an auction across multiple markets. At step 1000, a first market conducts a first auction for a first advertising impression. Such a first auction is an asynchronous auction where bids are placed ahead of an actual occurrence of an impression.

FIG. 11 illustrates the details for conducting the first auction of step 1000. Referring to FIG. 11, at step 1100, a first maximum bid is received (at the first market) from a first advertiser for placement of a first advertisement. The first maximum bid may be a bid that has been converted to a predicted cost per thousand impressions (CPM) bid.

At step 1102, a second maximum bid for placement of a second advertisement is determined (at the first market). The second maximum bid is the next highest bid amount to that of the first maximum bid.

At step 1104, the winning bid is selected. For example, the first advertisement/first maximum bid may be selected as the first auction winner.

At step 1106, a first ratio is computed that consists of the first maximum bid plus a spread (e.g., 5% or plus $0.05) to the second maximum bid.

At step 1108, a first price to be paid by the first advertiser is determined The first price to be paid is the lower of the first maximum bid or the first maximum bid multiplied by the first ratio.

Referring again to FIG. 10, at step 1002, the bids (i.e., the first maximum bid and the second maximum bid), and the spread are transmitted from the first market to the second market.

At step 1004, the second market conducts a second auction for a second advertising impression.

FIG. 12 illustrates the logical flow for conducting the second auction in accordance with one or more embodiments of the invention. At step 1200, a third maximum bid for placement of a third advertisement is determined (i.e., at the second market). Such a third maximum bid may be an internal reserve default bid or may be the highest bid received from multiple third party bidders.

At step 1202, the winning bid is selected (e.g., the first maximum bid is selected as a second auction winner).

Steps 1204-1208 are used to determine the second price to be paid by the first advertiser (i.e., for winning the bid in the second market). At step 1204, a second highest bid between the second maximum bid and the third maximum bid is determined.

At step 1206, a second ratio is computed that comprises the first maximum bid plus the spread to the second highest bid.

At step 1208, the second price to be paid (by the first advertiser) is computed as the first maximum bid multiplied by the second ratio. It may be noted that other types of second price auctions that do not utilize the maximum bid (e.g., second highest bid or second highest bid plus one penny) may also be utilized in accordance with embodiments of the invention.

Referring again to FIG. 10, at step 1006, the second market notifies the first market of the second price to be paid. Such a notification may be performed when redirecting an impression back to the first market to serve the advertisement or via another call such as a pixel or server side message.

Accordingly, FIGS. 10-12 illustrate the logical flow where a second market agrees that it will respect a first market's rules for second price auctions when its advertiser's win. In summary, the first market sends both the first and second highest bids, as well as specifies the spread (or the amounts that are utilized to determine the winning bid). The second market, either server side or browser side, receives these and if the first price wins the auction, then the second market uses the spread to determine the amount to be charged based on the higher of the second price sent from the first market, or the highest bid from all other bids (e.g., in a second price auction or RTB auction) including an internal reserve (e.g., default) bid. If other markets are bidding in the second market as well, their maximum bids would be considered in determining the maximum second bid. The second market then notifies the first market of the final price paid.

An alternative flow would be that the first market sends only the highest bid. The second market selects the winning bidder, but cannot determine the second price. Instead, the second market sends the first market the maximum bid among the losing bidders within the second market. The first market then uses this information to compute the price to be paid and notifies the second market of this amount. The advantage in this approach is that the first market does not need to reveal the second price to the second market, which it may prefer if it considers this competitive information.

In yet another alternative flow, the second market respects whatever rules were utilized to determine the winning bid by the first market (e.g., highest bid, second highest bid, second highest bid plus one penny, etc.). Such rules may be utilized in the second market or a different set of rules may be utilized that accommodates the first market's rules.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

While the present invention has been described with regards to particular embodiments, it is recognized that additional variations of the present invention may be devised without departing from the inventive concept.

What is claimed is:

1. A method for conducting an auction for advertising, said method comprising:
    receiving, by a computing system conducting an auction of a first market, a maximum bid from a first advertiser for placement of a first advertisement in the first market for an advertising impression in the first market;
    determining, by the computing system, a maximum bid from a second advertiser for placement of a second advertisement in the first market, the maximum bid from the second advertiser being a next highest bid amount to that of the maximum bid from the first advertiser;
    selecting, by the computing system, the maximum bid from the first advertiser associated with the first advertisement as a winner of the first auction in the first market;
    computing, by the computing system, a first market ratio defined by the maximum bid from the second advertiser plus a spread above the maximum bid from the second advertiser divided by the maximum bid from the first advertiser;
    determining, by the computing system, a first price to be paid by the first advertiser for placement of the first advertisement in the first market, the first price to be paid being a lower of the maximum bid from the first advertiser and the maximum bid from the first advertiser multiplied by the first market ratio;
    transmitting, from the computing system of the first market via a communications channel, the maximum bid from the first advertiser, the maximum bid from the second advertiser, and the spread to an auction in a second market for an advertising impression in the second market, the auction in the second market being operated by the computing system;
    determining, by the computing system, a maximum bid from a third advertiser for placement of a third advertisement in the second market;
    selecting, by the computing system, the maximum bid from the first advertiser as a winner of the auction in the second market as a result of the maximum bid from the first advertiser being the highest bid in the second market;
    determining, by the computing system, a second price to be paid by the first advertiser, the second price being for placement of the first advertisement in the second market by:
        determining, by the computing system, a next highest bid in the second market by comparing the maximum bid from the second advertiser and the maximum bid from the third advertiser;
        computing, by the computing system, a second market ratio defined by the next highest bid in the second market plus a spread above the next highest bid in the second market divided by the maximum bid from the first advertiser; and
    computing, by the computing system, the second price to be paid by the first advertiser, the second price being a lower of the maximum bid from the first advertiser and the maximum bid from the first advertiser multiplied by the second market ratio; and
    notifying, by the computing system communicating via the communications channel, the first market of the second price to be paid in the second market by the first advertiser.

2. The method of claim 1, wherein the auction in the first market comprises an asynchronous auction wherein bids are placed ahead of an actual occurrence of an impression.

3. The method of claim 1, wherein the maximum bid from the first advertiser comprises a bid that has been converted to a predicted cost per thousand impressions (CPM) bid.

4. The method of claim 1, wherein the maximum bid from the third advertiser comprises a default bid for the second market.

5. The method of claim 1, wherein the maximum bid from the third advertiser comprises a highest bid received from multiple third party bidders.

6. The method of claim 1, wherein the second market notifies the first market when redirecting an impression back to the first market.

7. The method of claim 1, wherein the second market notifies the first market using a pixel or server side message.

8. The method of claim 1, wherein conducting the auctions includes performing dynamic bidding in real time.

9. The method of claim 8, wherein conducting the auctions includes performing bidding that is dynamic and occurs in real time, and wherein conducting the auctions further include transmitting a variety of types of information about a user to receive an advertisement for which the auction is being conducted to solicit the bids.

10. The method of claim 9, wherein transmitting a variety of types of information includes transmitting at least one of prior bidding experiences, particular user based information based on a cookie, IP address information, and GPS based location information.

11. A system for conducting an auction for advertising comprising:
    a computing system configured to conduct a first auction for an advertising impression in a first market, said computing system configured to:
        receive, at the first market, a maximum bid from a first advertiser for placement of a first advertisement in the first market for the first advertising impression;
        determine, at the first market, a maximum bid from a second advertiser for placement of a second advertisement, the maximum bid from the second advertiser being a next highest bid amount to that of the maximum bid from the first advertiser, auction winner;
        compute a first market ratio defined by the maximum bid from the second advertiser plus a spread above the maximum bid from the second advertiser divided by the maximum bid from the first advertiser; and
        determine a first price to be paid by the first advertiser for placement of the first advertisement in the first market, the first price to be paid being a lower of the maximum bid from the first advertiser and the maximum bid from the first advertiser multiplied by the first market ratio;

the computing system further being configured to:
receive the maximum bid from the first advertiser, the maximum bid from the second advertiser, and the spread to an auction in a second market;
conduct the auction in the second market for a second advertising impression by:
determining, at the second computing system, a maximum bid from a third advertiser for placement of a third advertisement;
selecting the maximum bid from the first advertiser as a winner of the auction in the second market as a result of the maximum bid from the first advertiser being the highest bid in the second market;
determining a second price to be paid by the first advertiser for placement of the first advertisement in the second market by:
determining a next highest bid in the second market by comparing the maximum bid from the second advertiser and the maximum bid from the third advertiser;
computing a second market ratio defined by the next highest bid in the second market plus a spread above the next highest bid in the second market divided by the maximum bid from the first advertiser; and
computing the second price to be paid by the first advertiser, the second price being a lower of the maximum bid from the first advertiser and the maximum bid from the first advertiser multiplied by the second market ratio; and
notify the first market of the second price to be paid in the second market by the first advertiser.

12. The system of claim 11, wherein the auction in the first market comprises an asynchronous auction wherein bids are placed ahead of an actual occurrence of an impression.

13. The system of claim 11, wherein the maximum bid from the first advertiser comprises a bid that has been converted to a predicted cost per thousand impressions (CPM) bid.

14. The system of claim 11, wherein the maximum bid from the third advertiser comprises a default bid for the second market.

15. The system of claim 11, wherein the maximum bid from the third advertiser comprises a highest bid received from multiple third party bidders.

16. The system of claim 11, wherein the second market notifies the first market when redirecting an impression back to the first market.

17. The system of claim 11, wherein the second market notifies the first market using a pixel or server side message.

18. The system according to claim 11, wherein said computing system is a server.

19. The system according to claim 11, wherein said computing system includes a first computing system and a second computing system, the first computing system conducting the auction in the first market and the second computing system conducting the auction in the second market.

20. A method for conducting an auction for advertising comprising:
conducting, by a computing system, an auction in a first market for an advertising impression in the first market by:
receiving a maximum bid from a first advertiser for placement of a first advertisement in the first market;
determining a maximum bid by a second advertiser for placement of a second advertisement in the first market, the maximum bid from the second advertiser being a next highest bid amount to that of the maximum bid from the first advertiser;
selecting the first advertisement as an auction winner in the auction in the first market;
computing a first market ratio defined by the maximum bid from the second advertiser plus a spread above the maximum bid from the second advertiser divided by the maximum bid from the first advertiser; and
determining a first price to be paid by the first advertiser for placement of the first advertisement in the first market, the first price to be paid being a lower of the maximum bid from the first advertiser and the maximum bid from the first advertiser multiplied by the first market ratio;
transmitting, from the first computing system via a communications network, the maximum bid from the first advertiser, the maximum bid from the second advertiser, and the spread to a computing system conducting an auction in a second market;
conducting, by the computing system, the auction in the second market for an advertising impression in the second market by:
determining a maximum bid from a third advertiser for placement of a third advertisement in the second market;
selecting the maximum bid from the first advertiser as a an auction winner in the second market;
determining a second price to be paid by the first advertiser for placement of the first advertisement in the second market by:
determining a next highest bid in the second market by comparing the maximum bid from the second advertiser and the maximum bid from the third advertiser;
computing a value based on a fixed percentage of the spread between the highest bid from the first advertiser and the next highest bid on the auction in the second market; and
computing the second price to be paid by the first advertiser based on the computed value; and
notifying, by the computing system, the first market of the second price to be paid in the second market by the first advertiser.

21. The method of claim 20, wherein the second price to be paid by the first advertiser comprises the lesser of (a) the sum of the value and the next highest bid and (b) the maximum bid from the first advertiser.

22. The method of claim 20, wherein the second price to be paid by the first advertiser comprises the value plus a fixed amount.

23. A system for conducting an auction for advertising comprising:
a computing system configured to conduct an auction in a first market for placement of a first advertisement for a first advertising impression in the first market, said computing system being configured to:
receive a maximum bid from a first advertiser for placement of the first advertisement in the first market;
determine a maximum bid from a second advertiser for placement of a second advertisement in the first market, the maximum bid from the second advertiser being a next highest bid amount to that of the maximum bid from the first advertiser;
select the first advertisement as an auction winner of the first auction in the first market;
compute a first market ratio defined by the maximum bid from the second advertiser plus a spread above the maximum bid from the second advertiser divided by the maximum bid from the first advertiser; and determine a first price to be paid by the first advertiser for placement of the first advertisement in the first market, the first price to be paid being a lower of the maximum bid from the first advertiser and the maximum bid from the first advertiser multiplied by the first market ratio;

said computing system further conducting an auction in a second market, said computing system being further configured to:

receive the maximum bid from the first advertiser, the maximum bid from the second advertiser, and the spread to the second auction in the second market;

conduct the auction for an advertising impression in the second market, by:

determining a maximum bid from a third advertiser for placement of a third advertisement in the second market;

selecting the maximum bid from the first advertiser as a an auction winner of the auction in the second market;

determining a second price to be paid by the first advertiser for placement of the first advertisement in the second market by:

determining a next highest bid between the maximum bid from the second advertiser and the maximum bid from the third advertiser;

computing a value based on a fixed percentage of the spread between the highest bid from the first advertiser and the next highest bid; and computing the second price to be paid by the first advertiser based on the computed value; and notify the first market of the second price to be paid in the second market by the first advertiser.

24. The system of claim 23, wherein the second price to be paid by the first advertiser comprises the lesser of (a) the sum of the value and the next highest bid and (b) the maximum bid from the first advertiser.

25. The system of claim 23, wherein the second price to be paid by the first advertiser includes the computed value plus a fixed amount.

26. The system according to claim 23, wherein said computing system is a server.

27. The system according to claim 23, wherein said computing system includes a first computing system and a second computing system, the first computing system conducting the auction in the first market and the second computing system conducting the auction in the second market.

* * * * *